United States Patent
Liang

(10) Patent No.: US 9,268,687 B2
(45) Date of Patent: Feb. 23, 2016

(54) DATA WRITING METHOD, MEMORY CONTROL CIRCUIT UNIT AND MEMORY STORAGE APPARATUS

(71) Applicant: PHISON ELECTRONICS CORP., Miaoli (TW)

(72) Inventor: Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 120 days.

(21) Appl. No.: 14/166,768

(22) Filed: Jan. 28, 2014

(65) Prior Publication Data

US 2015/0134887 A1    May 14, 2015

(30) Foreign Application Priority Data

Nov. 14, 2013  (TW) .............................. 102141474 A

(51) Int. Cl.
*G06F 12/02* (2006.01)
*G06F 3/06* (2006.01)

(52) U.S. Cl.
CPC .......... *G06F 12/0246* (2013.01); *G06F 3/0652* (2013.01); *G06F 12/0253* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 6,065,020 | A * | 5/2000 | Dussud | G06F 12/0253 |
| 2011/0119442 | A1* | 5/2011 | Haines et al. | 711/113 |
| 2011/0292538 | A1* | 12/2011 | Haga et al. | 360/60 |
| 2013/0097362 | A1 | 4/2013 | Tan et al. | |
| 2014/0122774 | A1* | 5/2014 | Xian | G06F 12/0246 711/103 |
| 2014/0177085 | A1* | 6/2014 | Haga et al. | 360/48 |
| 2014/0310483 | A1* | 10/2014 | Bennett | 711/154 |
| 2015/0026390 | A1* | 1/2015 | Li | G06F 12/0253 711/103 |

OTHER PUBLICATIONS

"Office Action of Taiwan Counterpart Application", issued on Oct. 28, 2015, p. 1-p. 5.

* cited by examiner

*Primary Examiner* — Kris Rhu
(74) *Attorney, Agent, or Firm* — Jianq Chyun IP Office

(57) ABSTRACT

A data writing method for a rewritable non-volatile memory module having a plurality of physical erasing units, and a memory control circuit unit and the memory storage apparatus are provided. The method includes: grouping the physical erasing units into at least a data area and a spare area; configuring a plurality of logical units for mapping to the physical erasing units of the data area; and dynamically reserving a predetermined number of physical erasing units dedicating to write sequential data. Accordingly, the method can fast write the sequential data with the page-based memory management.

15 Claims, 26 Drawing Sheets

DATA WRITING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 102141474, filed on Nov. 14, 2013. The entirety of the above-mentioned patent application is hereby incorporated by reference herein and made a part of this specification.

BACKGROUND

1. Technology Technical Field

The present invention relates to a data writing method for a non-volatile memory module, and a memory control circuit unit and a memory storage apparatus using the same.

2. Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage apparatus which utilizes a flash memory as its storage medium. For these reasons, the flash memory has become an import part of the electronic industries.

A flash memory storage module includes a plurality of physical erasing units, and each of the physical erasing units has a plurality of physical programming units, and data is written into the physical erasing unit according to a sequence of the physical programming units. In addition, the physical programming units already written with data must be erased before it can be used again for writing data. In particular, the physical erasing unit is served as a smallest unit for erasing data, whereas the physical programming unit is served as a smallest unit for programming (or writing). Therefore, in a management of the flash memory module, the physical erasing units may be divided into at least a data area and a spare area.

The physical erasing units of the data area are used to store data stored by the host system. More specifically, a memory control circuit unit in the memory storage apparatus may convert logical access addresses to be accessed by the host system into logical pages of logical blocks, and map the logical pages of the logical blocks to the physical programming units of the physical erasing units of the data area. Namely, in the management of the flash memory module, the physical erasing units of the data area are regarded as the physical erasing units already being used (e.g., already stored with data written by the host system). For instance, the memory control circuit unit may use a logical-to-physical address mapping table to record a mapping relation between the logical blocks and the physical erasing units of the data area, in which the logical pages in the logical blocks are corresponding to the physical programming units of the physical erasing units being mapped.

The physical erasing units of the spare area are used to alternately exchange the physical erasing units in the data area. More specifically, as described above, the physical erasing unit written with data must be erased before it can be used again to write the data. Therefore, the physical erasing units of the spare area are designed to write random data for exchanging the physical erasing units mapped to the logical blocks. Accordingly, the physical erasing units of the spare area are either empty or available physical erasing units (i.e., in which data are not recorded or data are marked as invalid).

In other words, the physical programming units of the physical erasing units in the data area and the spare data are alternately exchanged for mapping to the logical pages of the logical blocks, so as to store the data written by the host system. For instance, in case the logical access address to be written with the random data from the host system is corresponding to one specific logical page of one specific block, the memory control circuit unit of the memory storage apparatus may select one or more physical erasing units from the spare area, write the random data into the physical programming units of the selected physical erasing units, and relate the physical erasing unit to be written with the data to the data area.

Particularly, during operations of the memory storage apparatus, in case the spare area is about to run out of the physical erasing units, the memory control circuit unit of the memory storage apparatus may arrange valid data in at least one physical erasing unit of the data area into the physical programming units not being used in other physical erasing units in the data area (hereinafter, known as "a valid data merging operation"). Accordingly, an erasing operation may be performed on the physical erasing units stored with the invalid data, and the erased physical erasing units may be related to the spare area, so that a mechanism of alternately exchanges may be maintained to execute subsequent write commands.

However, execution of said data merging procedure is quite time consuming. Therefore, in case the host system requests to write a great amount of data within a short time period (e.g., a request instructing to write the data in a buffer memory into the rewritable non-volatile memory when power is about to go off) and the physical erasing units of the spare area are about to run out, it may consume a great amount of time for the memory control circuit unit of the memory storage apparatus to execute the data merging procedure. As a result, the data may not be written within a predetermined time, leading to loss in the data stored by the system.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data writing method, a memory control circuit unit and a memory storage apparatus, capable of reducing a time for writing a sequential data.

Accordingly, a data writing method for a rewritable non-volatile memory module is provided according to an exemplary embodiment of the invention, in which the rewritable non-volatile memory module has a plurality of physical erasing units. The method includes: grouping the physical erasing units into at least a data area and a spare area; configuring a plurality of logical units for mapping to the physical erasing units of the data area; and dynamically reserving a predetermined number of physical erasing units dedicating to write sequential data.

A memory control circuit unit for a rewritable non-volatile memory module is provided according to an exemplary embodiment of the invention, in which the rewritable non-volatile memory module has a plurality of physical erasing units. The memory control circuit unit includes a host interface, a memory interface and a memory management circuit. The host interface is configured to couple to a host system. The memory interface is used for coupling to the rewritable non-volatile memory module. The memory management circuit is coupled to the host interface and the memory interface. The memory management circuit is configured to group the physical erasing units into at least a data area and a spare area, configure a plurality of logical units for mapping to the physical erasing units of the data area, and dynamically reserve a predetermined number of physical erasing units dedicating to write sequential data.

A memory storage apparatus is provided according to an exemplary embodiment of the invention, which includes a connection interface unit, a rewritable non-volatile memory module and a memory control circuit unit. The connection interface unit is configured to couple to a host system. The rewritable non-volatile memory module includes a plurality of physical erasing units. The memory control circuit unit is coupled to the connection interface unit and the rewritable non-volatile memory module. The memory control circuit unit is configured to group the physical erasing units into at least a data area and a spare area, configure a plurality of logical units for mapping to the physical erasing units of the data area, and dynamically reserve a predetermined number of physical erasing units dedicating to write sequential data.

Based on above, in the data writing method, the memory control circuit unit and the memory storage apparatus, the physical erasing units dedicating to write the sequential data are dynamically reserved, so as to avoid the execution of the data merging procedure for reducing the time for writing a great amount of sequential data.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
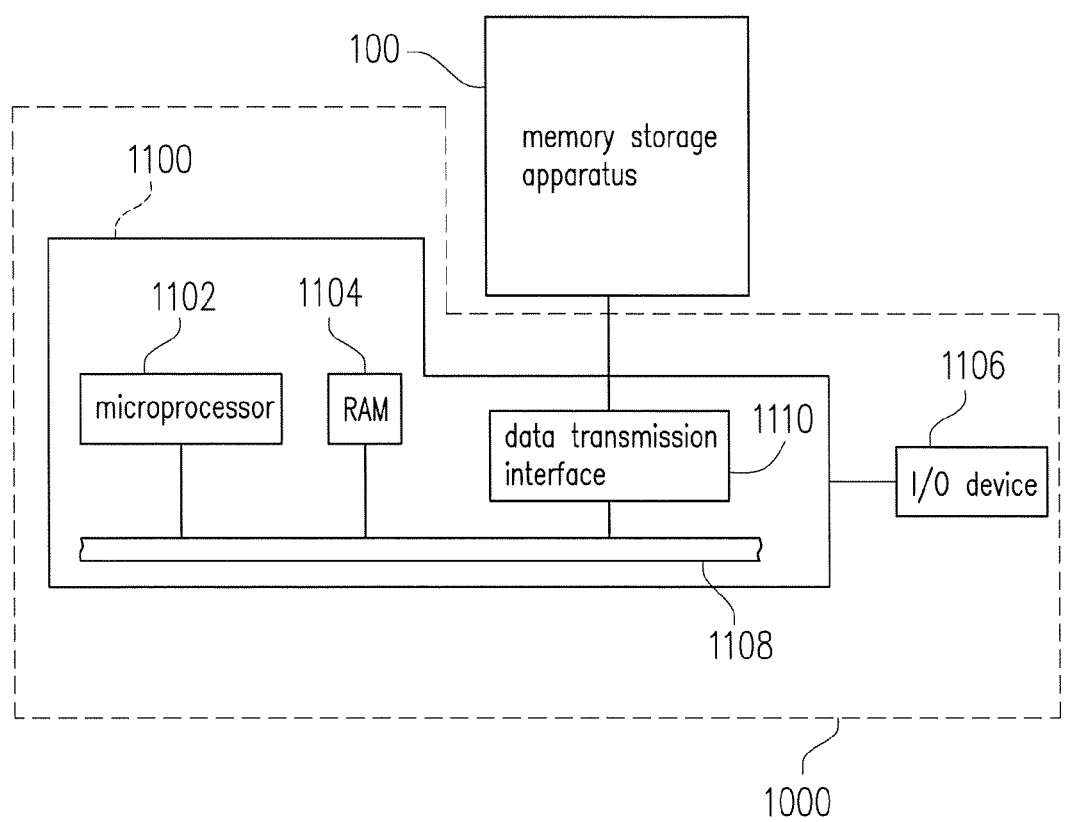
FIG. 1 illustrates a host system and a memory storage apparatus according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A data writing method proposed by the invention includes grouping physical erasing units of a rewritable non-volatile memory module into at least a data area and a spare area, configuring a plurality of logical units for mapping to the physical erasing units of the data area, and dynamically reserving a predetermined number of physical erasing units in the rewritable non-volatile memory module dedicating to write a sequential data. In particular, the number of the physical erasing units in the data area may be reduced to reduce a volume (i.e., logical addresses or units) of the memory storage apparatus used by a user, and the reduced volume is reserved dedicating to write the sequential data. Accordingly, a rewritable non-volatile memory storage apparatus with a random writing architecture (also known as a page-based memory management architecture) may effectively reduce a time for writing a great amount of sequential data intended to be stored by the host system into the rewritable non-volatile memory storage module. Exemplary embodiments are described below to further illustrate the invention in more detail.

Generally, a memory storage apparatus (also known as a memory storage system) includes a rewritable non-volatile memory module and a controller (also known as a control circuit). The memory storage apparatus is usually configured together with a host system so that the host system may write data to or read data from the memory storage apparatus.

FIG. 1 illustrates a host system and a memory storage apparatus according to an exemplary embodiment.

Figure 2:
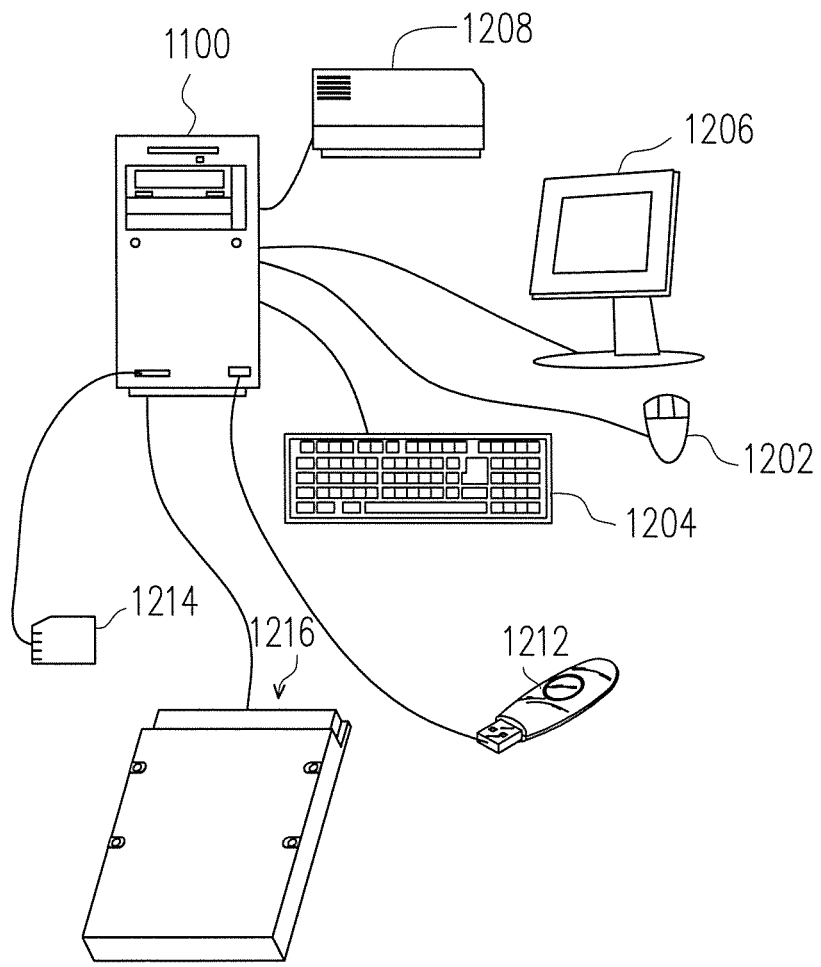
FIG. 2 is a schematic diagram of a computer, an input/output device, and a memory storage apparatus according to an exemplary embodiment of the invention.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1208 as shown in FIG. 2. It should be understood that the devices illustrated in FIG. 2 are not intended to limit the I/O device 1106, and the I/O device 1106 may further include other devices.

In the embodiment of the present invention, the memory storage apparatus 100 is coupled to other devices of the host system 1000 through the data transmission interface 1110. By using the microprocessor 1102, the random access memory (RAM) 1104 and the Input/Output (I/O) device 1106, data may be written into the memory storage apparatus 100 or may be read from the memory storage apparatus 100. For example, the memory storage apparatus 100 may be a rewritable non-volatile memory storage apparatus such as a flash drive 1212, a memory card 1214, or a solid state drive (SSD) 1216 as shown in FIG. 2.

Figure 3:
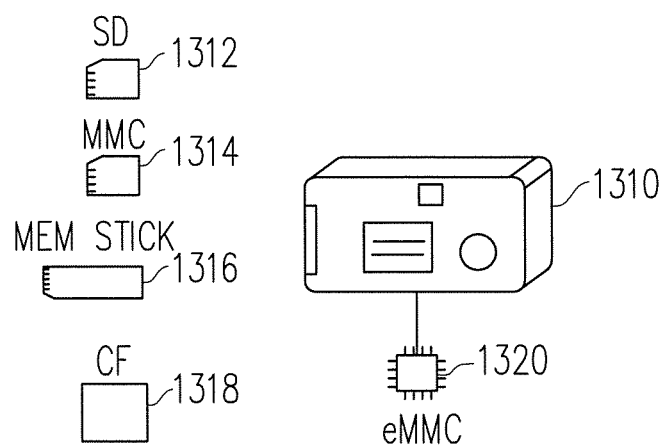
FIG. 3 is a schematic diagram of a host system and a memory storage apparatus according to an exemplary embodiment of the invention.

Generally, the host system 1000 may substantially be any system capable of storing data with the memory storage apparatus 100. Although the host system 1000 is described as a computer system in the present exemplary embodiment, in another exemplary embodiment of the invention, the host system 1000 may be a digital camera, a video camera, a telecommunication device, an audio player, or a video player. For example, if the host system is a digital camera (video camera) 1310, the rewritable non-volatile memory storage apparatus may be a SD card 1312, a MMC card 1314, a memory stick 1316, a CF card 1318 or an embedded storage device 1320 (as shown in FIG. 3). The embedded storage device 1320 includes an embedded MMC (eMMC). It should be mentioned that the eMMC is directly coupled to a substrate of the host system.

Figure 4:
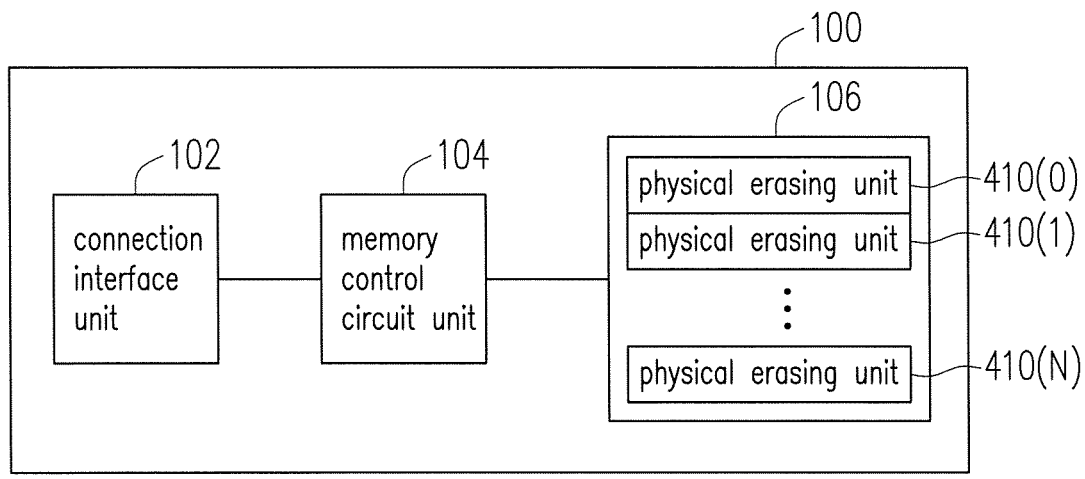
FIG. 4 is a schematic block diagram of the memory storage apparatus depicted in FIG. 1.

FIG. 4 is a schematic block diagram of the memory storage apparatus depicted in FIG. 1.

Referring to FIG. 4, the memory storage apparatus 100 includes a connection interface unit 102, a memory control circuit unit 104 and a rewritable non-volatile memory storage module 106.

In the present exemplary embodiment, the connection interface unit 102 is compatible with a serial advanced technology attachment (SATA) standard. However, the invention is not limited thereto, and the connection interface unit 102 may also be compatible to Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit and the memory control circuit unit may be packaged into one chip, or distributed outside of a chip containing the memory control circuit unit.

The memory control circuit unit 104 is configured to execute a plurality of logic gates or control commands which are implemented in a hardware form or in a firmware form, so as to perform operations of writing, reading or erasing data in the rewritable non-volatile memory storage module 106 according to the commands of the host system 1000.

The rewritable non-volatile memory storage module 106 is coupled to the memory control circuit unit 104 and configured to store data written from the host system 1000. The rewritable non-volatile memory storage module 106 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundancy bit area. The data bit area having multiple physical access address is used to store user data, and the redundant bit area is used to store system data (for example, control information and error checking and correcting code). In the present exemplary embodiment, each data bit area of the physical programming unit contains 4 physical access addresses, and the size of each physical access address is 512 bytes. However, in other exemplary embodiments, more or less number of the physical address may be contained in the data bit area, amount and size of the physical access address are not limited in the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 106 is a Multi Level Cell (MLC) NAND flash memory module (i.e., a flash memory module capable of storing two bits of data in one memory cell). However, the present invention is not limited thereto. The rewritable non-volatile memory module 106 may also be a Single Level Cell (SLC) NAND flash memory module, (i.e., a flash memory module capable of storing one bit of data in one memory cell), a Trinary Level Cell (TLC) NAND flash memory module (i.e., a flash memory module capable of storing three bits of data in one memory cell), other flash memory modules or any memory module having the same features.

Figure 5:
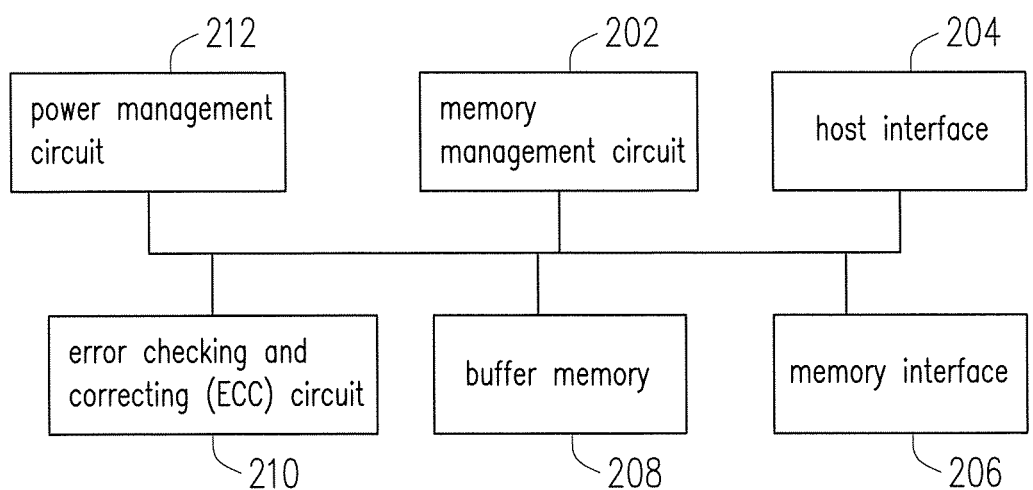
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 104 includes a memory management circuit 202, a host interface 204 and a memory interface 206.

The memory management circuit 202 is configured to control overall operations of the memory control circuit unit 104. Specifically, the memory management circuit 202 has a plurality of control commands. When the memory storage apparatus 100 operates, the control commands are executed to perform various operations such as data writing, data reading and data erasing.

In the present exemplary embodiment, the control commands of the memory management circuit 202 are implemented in a form of a firmware. For instance, the memory management circuit 202 has a microprocessor unit (not illustrated) and a ROM (not illustrated), and the control commands are burned into the ROM. When the memory storage apparatus 100 operates, the control commands are executed by the microprocessor to perform operations of writing, reading or erasing data.

In another exemplary embodiment of the invention, the control commands of the memory management circuit 202 may also be stored as program codes in a specific area (for example, the system area in a memory exclusively used for storing system data) of the rewritable non-volatile memory module 106. In addition, the memory management circuit 202 has a microprocessor unit (not illustrated), a ROM (not illustrated) and a RAM (not illustrated). In particular, the ROM has an activate code, which is executed by the microprocessor unit to load the control commands stored in the rewritable non-volatile memory module 106 to the RAM of the memory management circuit 202 when the memory control circuit unit 104 is enabled. Next, the control commands are executed by the microprocessor unit to perform operations of writing, reading or erasing data.

Further, in another exemplary embodiment of the invention, the control commands of the memory management circuit 202 may also be implemented in a form of hardware. For example, the memory management circuit 202 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured for managing the physical erasing unit of the rewritable non-volatile memory module 106; the memory writing circuit is configured for issuing a write command to the rewritable non-volatile memory module 106 in order to write data into the rewritable non-volatile memory module; the memory reading circuit is configured for issuing a read command to the rewritable non-volatile memory module 106 in order to read data from the rewritable non-volatile memory module 106; the memory erasing circuit is configured for issuing an erase command to the rewritable non-volatile memory module 106 in order to erase data from the rewritable non-volatile memory module 106; the data processing circuit is configured for processing both the data to be written into the rewritable non-volatile memory module 106 and the data to be read from the rewritable non-volatile memory module 106.

The host interface 204 is coupled to the memory management circuit 202 and configured for receiving and identifying commands and data sent from the host system 1000. Namely, the commands and data sent from the host system 1000 are passed to the memory management circuit 202 through the host interface 204. In the present exemplary embodiment, the host interface 204 is compatible to a SATA standard. However, it is to be understood that the invention is not limited thereto. The host interface 204 may also be PATA standard, IEEE 1394 standard, PCI Express standard, USB standard, UHS-I interface standard, UHS-II interface standard, SD standard, MS standard, MMC standard, CF standard, IDE standard, or other suitable standards for data transmission.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

In an exemplary embodiment of the invention, the memory control circuit unit 104 further includes a buffer memory 208, a power management circuit 210 and an error checking and correcting circuit 212.

The buffer memory 208 is coupled to the memory management circuit 202 and configured to temporarily store data and commands from the host system 1000 or data from the rewritable non-volatile memory module 106.

The power management unit 210 is coupled to the memory management circuit 202 and configured to control a power of the memory storage apparatus 100.

The error checking and correcting circuit 212 is coupled to the memory management circuit 202 and configured to perform an error checking and correcting process to ensure the correctness of data. Specifically, when the memory management circuit 202 receives a write command from the host system 1000, the error checking and correcting circuit 212 generates an error checking and correcting code (ECC code) for data corresponding to the write command, and the memory management circuit 202 writes data and the ECC code corresponding to the write command to the rewritable non-volatile memory module 106. Next, when reading data from the rewritable non-volatile memory module 106, the memory management circuit 202 also reads the ECC Code corresponding to such data, and the error checking and correcting circuit 212 performs an error checking and correcting process on the read data based on the read ECC code.

Figure 6:
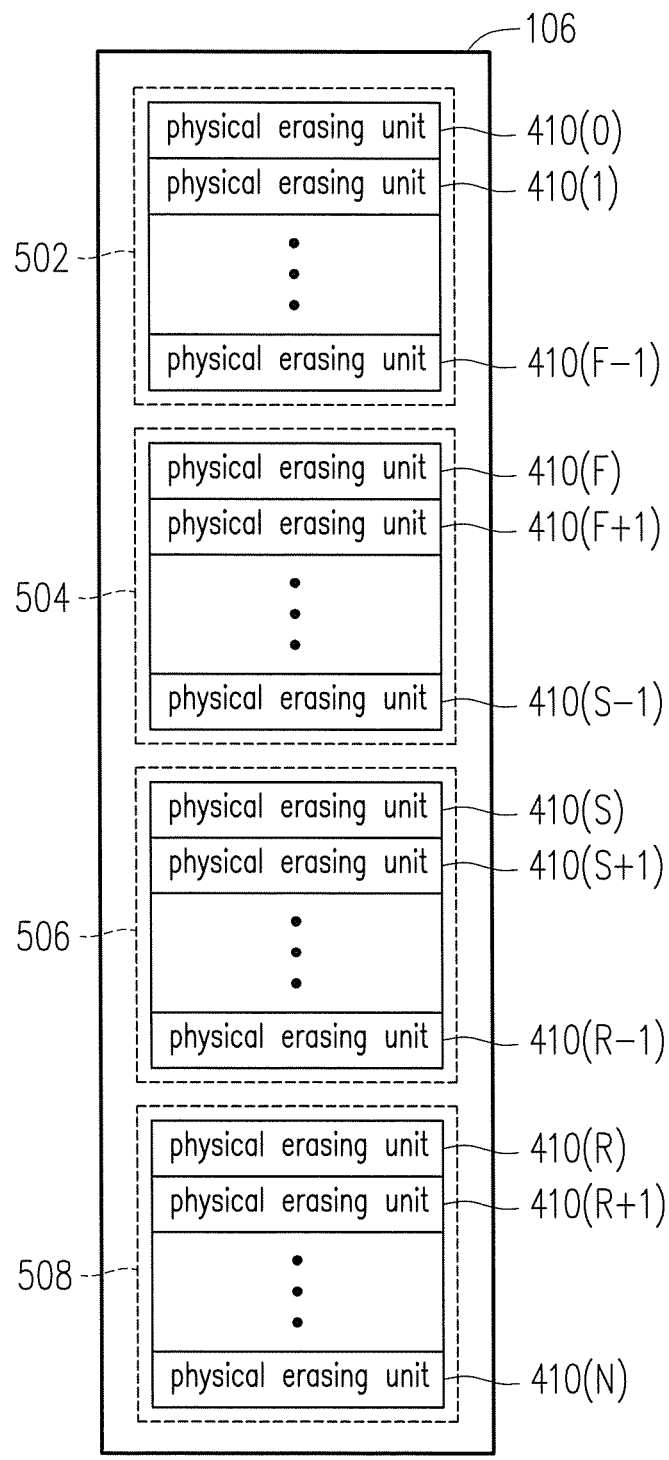
FIG. 6 and FIG. 7 are schematic diagrams illustrating a management of physical blocks according to first exemplary embodiment.
Figure 7:
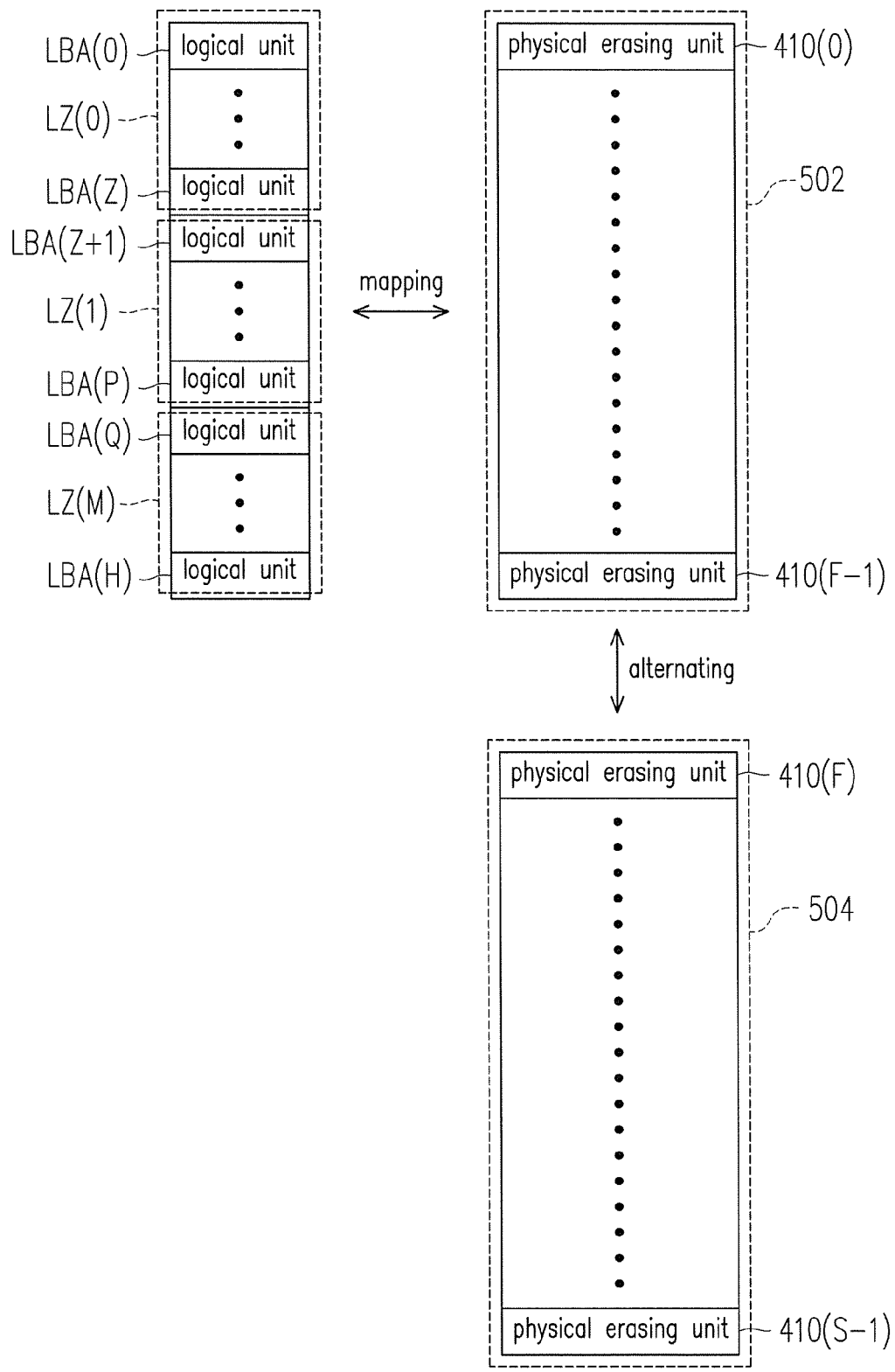

FIG. 6 and FIG. 7 are schematic diagrams illustrating a management of physical erasing units according to first exemplary embodiment of the invention.

Referring to FIG. 6, the memory control circuit unit 104 (or the memory management circuit 202) may logically group the physical erasing units 410(0) to 410(N) into a data area 502, a spare area 504, a system area 506 and a replacement area 508.

Logically, the physical erasing units belonged to the data area 502 and the spare area 504 are used to store data from the host system 1000. More specifically, the physical erasing units of the data area 502 are regarded as the physical erasing units stored with the data, whereas the physical erasing units of the spare area 504 are used for exchanging the physical erasing units of the data area 502. In other words, when the write command and the data to be written are received from the host system 1000, the memory management unit 202 may select the physical erasing units from the spare area 504, and write the data into the selected physical erasing units for exchanging the physical erasing units in the data area 502.

The physical erasing units logically belonged to the system area 506 are used to record system data. For example, the system data includes information related to manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 508 are used in a bad physical erasing unit replacement procedure for replacing damaged physical erasing units. More specifically, if available physical erasing units are still present in the replacement area 508 when the physical erasing units of the data area 502 are damaged, the memory management circuit 202 may select the available physical erasing units from the replacement area 508 for replacing the damaged physical erasing units.

In particular, the numbers of the physical erasing units in the data area 502, the spare area 504, the system 506 and the replacement area 508 may be different from one another according to the different memory specifications. In addition, it should be understood that, during the operation of the memory storage apparatus 100, grouping relations of the physical erasing units related to the data area 502, the spare area 504, the system area 506, and replacement area 508 may be dynamically changed. For example, when the damaged physical erasing units in the spare area 504 are replaced by the physical erasing units in the replacement area 508, the physical erasing units originally from the replacement area 508 are then related to the spare area 504.

Referring to FIG. 7, the memory control circuit unit 104 (or the memory management circuit 202) may configure logical units LBA(0) to LBA(H) for mapping to the physical erasing units of the data area 502, in which each of the logical units includes a plurality of logical pages for mapping to the corresponding physical programming units of the physical erasing units. Further, when the host system 1000 intends to write the data into the logical units or update the data stored in the logical units, the memory control circuit unit 104 (or the memory management unit 202) may select one physical erasing units from the spare area 504 for writing the data, so as to alternately exchange the physical erasing units of the data area 502.

In order to identify the physical erasing units for storing the data of the each logical unit, in the present exemplary embodiment, the memory control circuit unit 104 (or the memory management circuit 202) may record the mapping relations between the logical units and the physical erasing units. Further, when the host system 1000 intends to access the data in the logical pages, the memory control circuit unit 104 (or the memory management circuit 202) may first confirm the logical unit to which the logical page belongs, and access the data from the physical erasing units mapped to the logical unit. For instance, in the present exemplary embodiment, the memory control circuit unit 104 (or the memory management circuit 202) may store a logical-to-physical address mapping table in the rewritable non-volatile memory module 106 for recording the physical erasing units mapped to each of the logical units, and the logical-to-physical address mapping table are loaded into the buffer memory 208 for maintenance when the memory control circuit unit 104 (or the memory management circuit 202) intends to the access the data.

It should be noted that, a volume of the buffer memory 208 is limited, so that a mapping table recording a mapping relation of all the logical units cannot be stored. Therefore, in the present exemplary embodiment, the memory control circuit unit 104 (or the memory management unit 202) groups the logical units LBA(0) to LBA(H) as a plurality of logical zones LZ(0) to LZ(M), and configures one logical-to-physical address mapping table for each of the logical zones. In particular, when the memory control circuit unit 104 (or the memory management unit 202) intends to update the mapping table for one specific logical unit, the logical-to-physical address mapping table corresponding to the logical zone to which the logical unit belongs to is loaded to into the buffer memory 208 to be updated.

As described above, in the present exemplary embodiment, the rewritable non-volatile memory module 106 of the memory storage apparatus 100 is of the page-based management. Accordingly, when the write command is executed, regardless of the logical pages of the which logical unit are to be written, the memory control circuit unit 104 (or the memory management unit 202) may write the data in a manner of one physical programming unit after another physical programming unit (hereinafter, refer to as the random writing mechanism). More specifically, the memory control circuit unit 104 (or the memory management circuit 202) may select an empty physical erasing unit from the spare area 504 to be used as a current physical erasing unit for writing the data therein. Further, when the current physical erasing unit used is full of data, the memory control circuit unit 104 (or the memory management circuit 202) may select another empty physical erasing unit from the spare area 504 to be used as the current physical erasing unit for continuously writing random data corresponding to the write command from the host system 1000 therein. Particularly, in order to prevent the physical erasing units of the spare area 504 from being used up, when the number of the physical erasing units of the spare area 504 is reduced to a garbage collection threshold value being set, the memory control circuit unit 104 (or the memory management circuit 202) may execute a data merging procedure, so that the data of at least one physical erasing unit of the data area 502 becomes an invalid data, and all the data being the invalid data in the data area 502 are then related back to the spare area 504. For instance, when the data merging procedure is executed, the memory control circuit unit 104 (or the memory management circuit 202) is required to use at least one empty physical erasing unit. Therefore, the garbage collection threshold value is set to be at least grater than a minimum threshold value (i.e., 1). Particularly, in the present exemplary embodiment, the memory control circuit unit 104 (or the memory management unit 202) may identify whether the data being written is the sequential data or the random data, and the garbage collection threshold value may be dynamically adjusted according to a number of the sequential data being written. More specifically, actions for the host system 1000 to write data may be divided into a sequential writing mode and a random writing mode. In the sequential writing mode, the host system 1000 sequentially writes a plurality of data into a plurality of consecutive logical pages. In the random writing mode, the host system 1000 writes the data into a plurality of nonconsecutive logical pages. For example, first random data is written into a fifth logical page, and then a second random data is written into a third logical page. Herein, the data written by the host system 1000 in the sequential writing mode is referred to as the sequential data, and the data written by the host system 1000 in the random writing mode is referred to as the random data. Particularly, as described above, in the present exemplary embodiment, a predetermined numbers of the physical erasing units in the rewritable non-volatile memory module are reserved dedicating to write the sequential data. Accordingly, the memory control circuit unit 104 (or the memory management circuit 202) may dynamically adjust the garbage collection threshold value according to the number of the sequential data being written, so as to prevent the physical erasing units reserved to write the sequential data from being used to write the random data.

FIGS. 8 to 20 are schematic diagrams illustrating random data written by using a random writing mechanism according to an exemplary embodiment of the invention.

Figure 8:
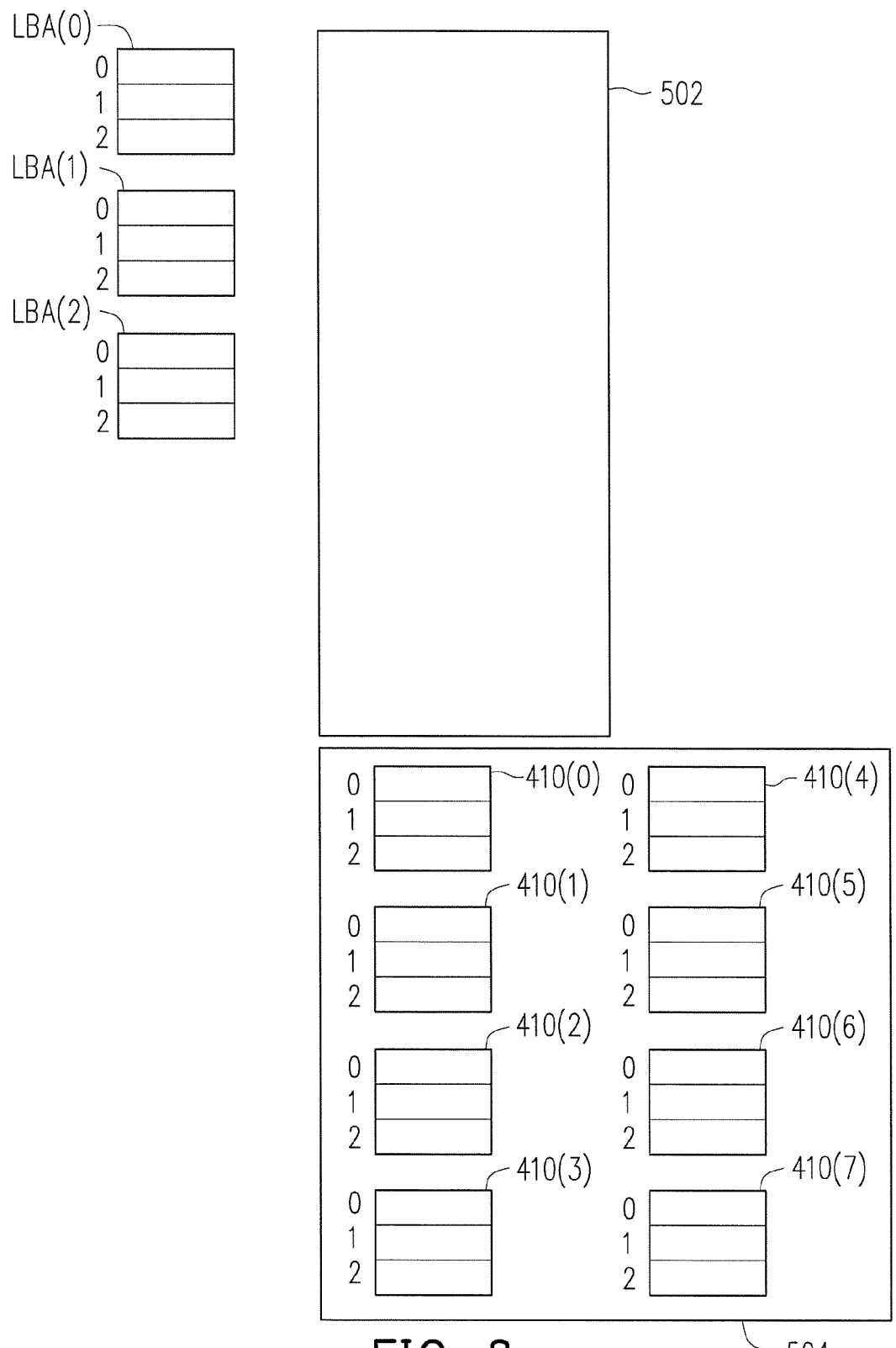
FIGS. 8 to 20 are schematic diagrams illustrating random data written by using a random writing mechanism according to an exemplary embodiment of the present invention.

Referring to FIG. 8, for convenience of illustration, it is assumed herein that the data area 502 is initially not included with the physical erasing units mapped to the logical units (i.e., the memory storage apparatus 100 is not yet written with a user data after a formatting process); the spare area 504 includes eight of the physical erasing units; each of the physical erasing units includes three of the physical programming units; and the data to be written into each of the physical erasing units must be written according to a sequence of the physical programming units. In addition, it is also assumed that three of the physical erasing units are reserved dedicating to write the sequential data; one of the physical erasing units may used for writing the data alternately; and one of the physical erasing units is reserved for the data merging procedure. Accordingly, the garbage collection threshold value is initially set to 4, and a volume mapped to the logical units is set to a volume of three of the physical erasing units. In other words, for the memory storage apparatus 100 having the eight of physical erasing units, a volume provided to the host system 1000 may originally set to a volume of six of the physical erasing units. However, after the physical erasing units dedicating to write the data are reserved, only the volume of three of the physical erasing units may be provided to the host system 1000. Namely, the host system 1000 may identify the volume of the memory storage apparatus 100 is the volume of three of the physical erasing units (i.e., the logical units LBA (0) to LBA(2)). It should be noted that, despites that in the present example, the number of the physical erasing units reserved dedicating to write the sequential data is identical to a volume of the logical units being configured, but the invention is not limited thereto. The number of the physical erasing units reserved dedicating to write the sequential data may also be less than the volume of the logical units being configured.

Figure 9:
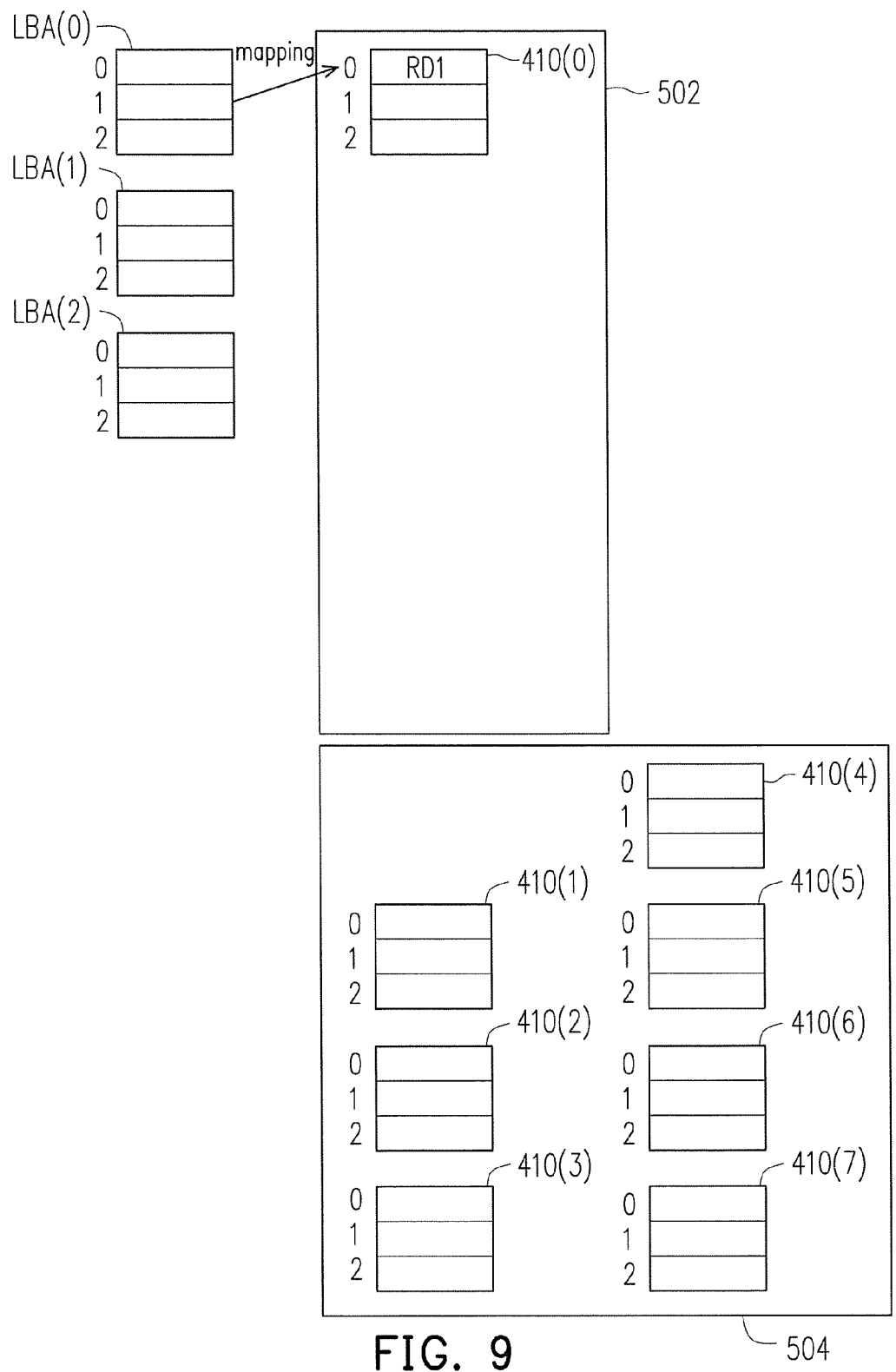

Referring to FIG. 9, it is assumed random data RD1 is to be programmed and the random data RD1 belongs to a first logical page of the logical unit LBA(0), the memory control circuit unit 104 (or the memory management circuit 202) may select the physical erasing unit 410(0) from the spare area 504, issue a programming command to write the random data RD1 into a zeroth physical programming unit of the physical erasing unit 410(0), and associate the physical erasing unit 410(0) with the data area 502.

Figure 10:
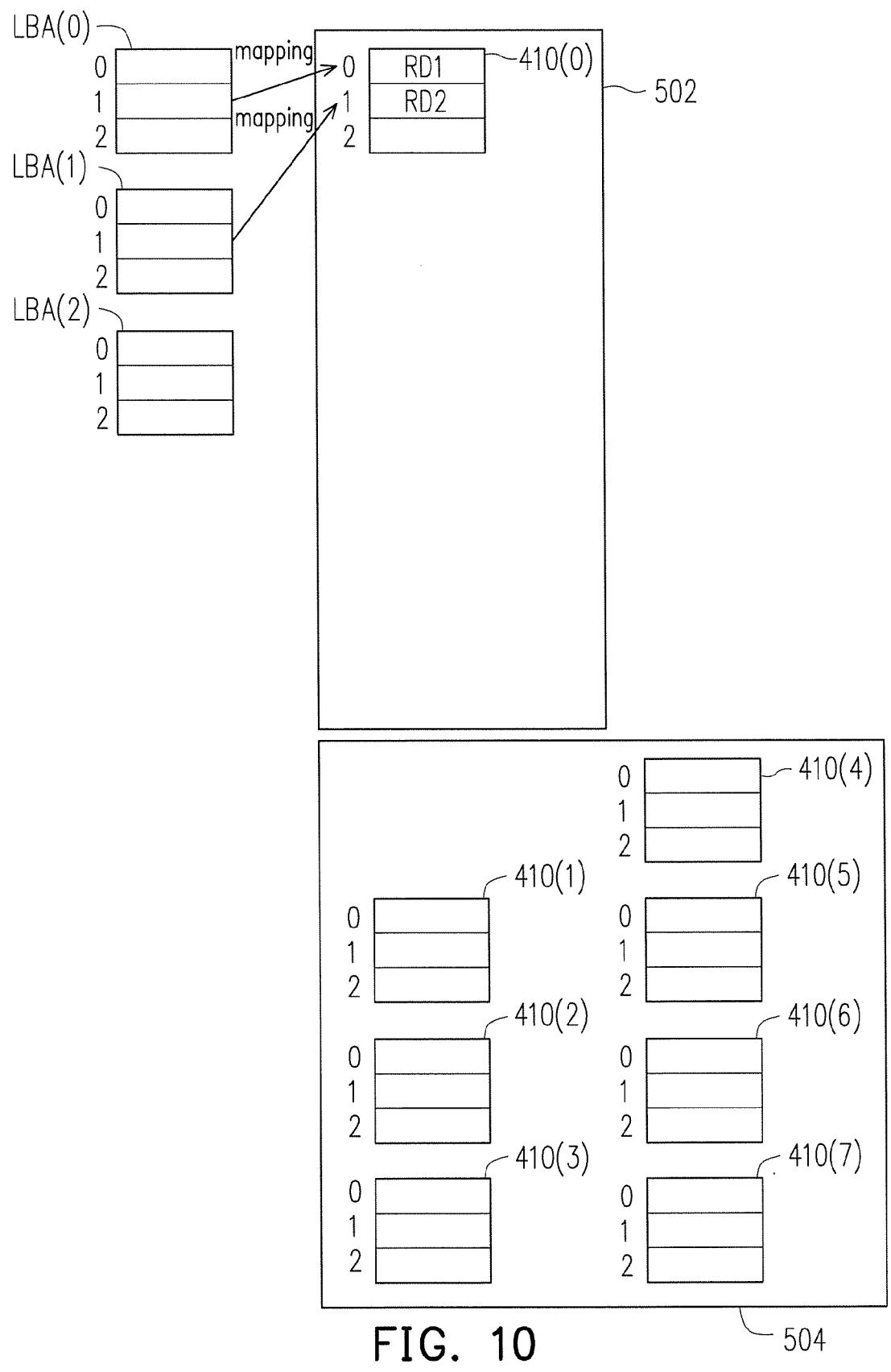

Referring to FIG. 10 as continue to FIG. 9, it is further assumed that random data RD2 is to be programmed and the random data RD2 belongs to a zeroth logical page of the logical unit LBA(1), the memory control circuit unit 104 (or the memory management circuit 202) may issue a programming command to write the random data RD2 into a first physical programming unit of the physical erasing unit 410(0).

Figure 11:
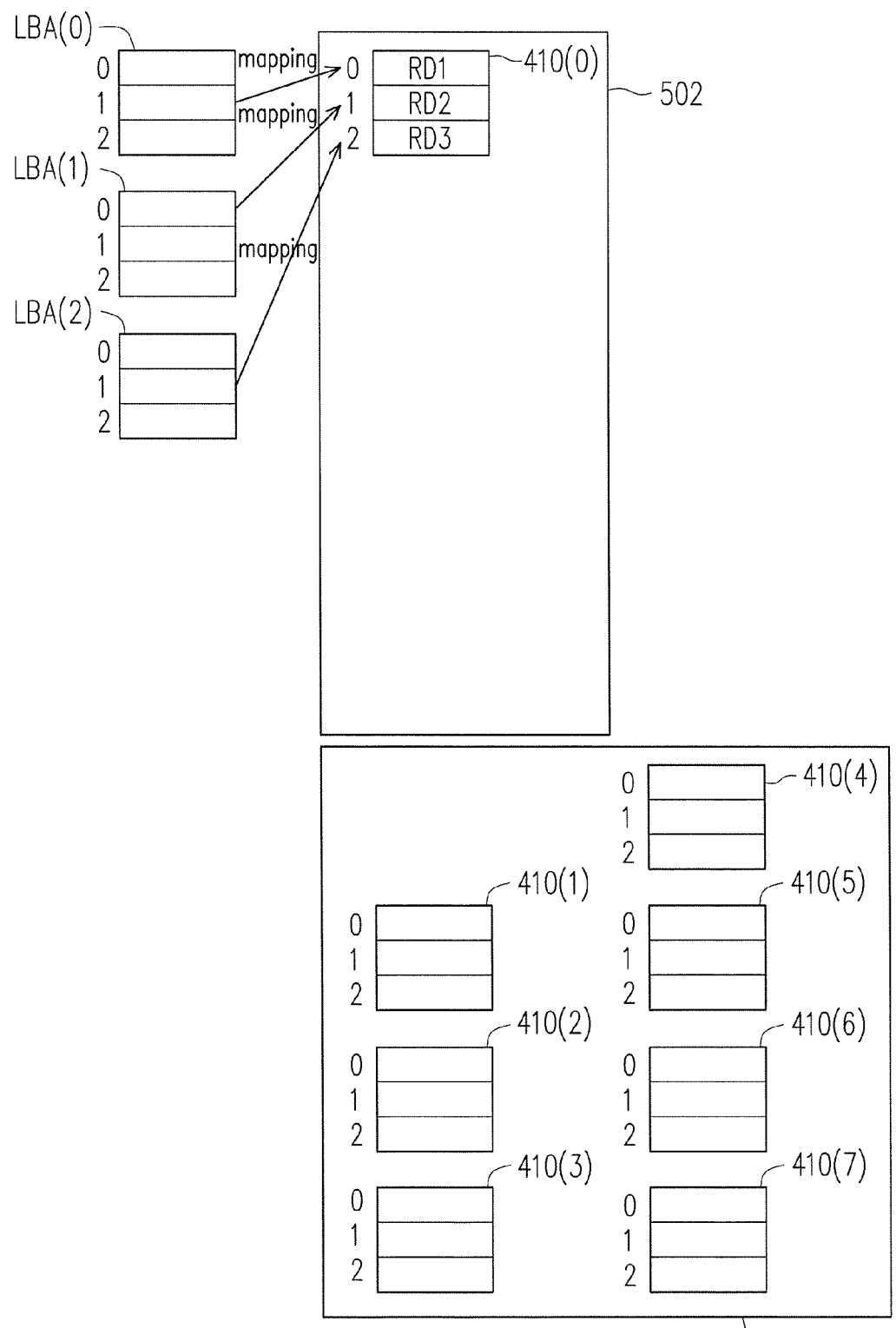

Referring to FIG. 11 as continue to FIG. 10, it is further assumed that random data RD3 is to be programmed and the random data RD3 belongs to a first logical page of the logical unit LBA(2), the memory control circuit unit 104 (or the memory management circuit 202) may issue a programming command to write the random data RD3 into a second physical programming unit of the physical erasing unit 410(0).

Figure 12:
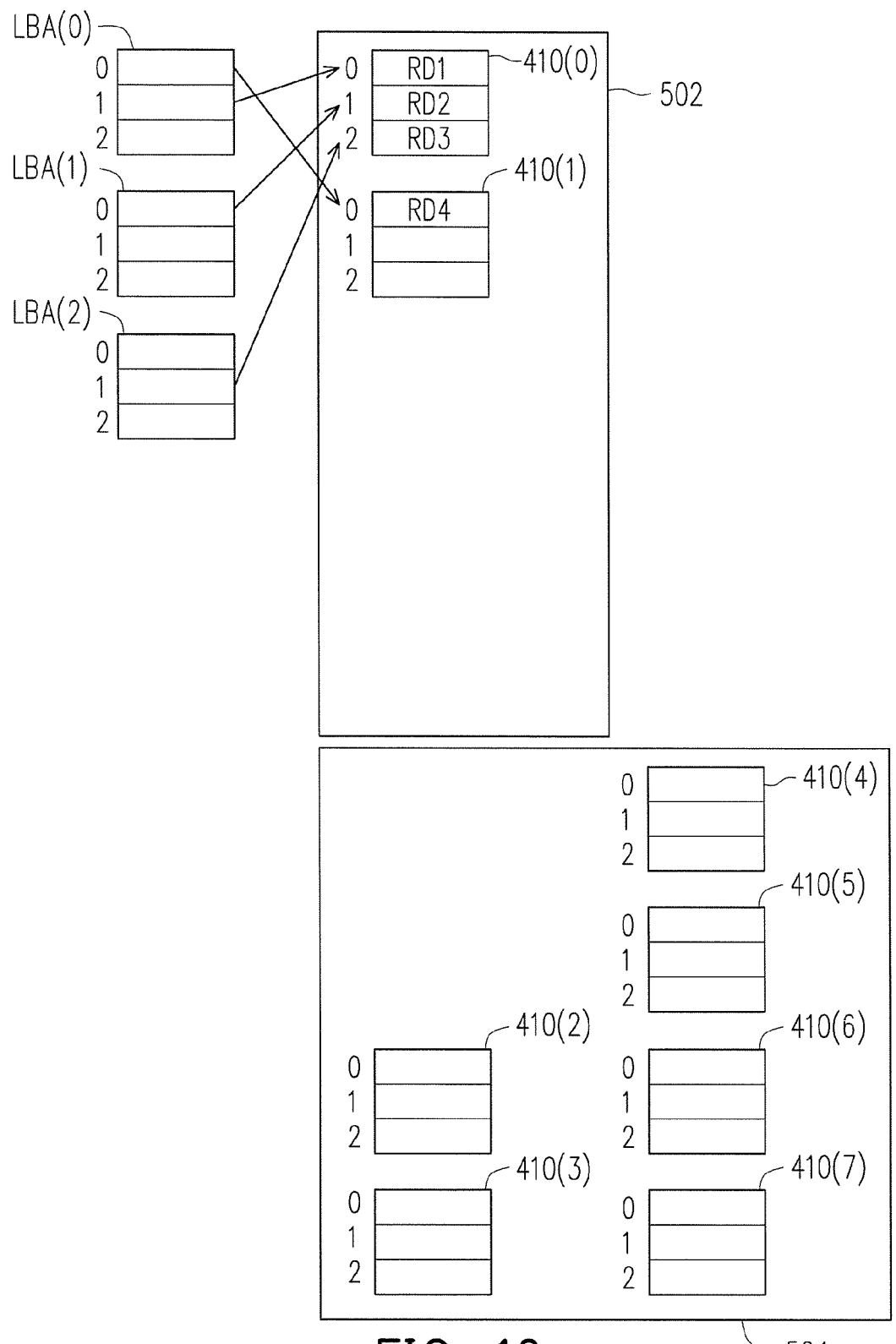

Referring to FIG. 12 as continue to FIG. 11, it is further assumed that random data RD4 is to be programmed and the random data RD4 belongs to a zeroth logical page of the logical unit LBA(0), but the physical erasing unit 410(0) is run out of storage spaces at the time. Therefore, the memory control circuit unit 104 (or the memory management circuit 202) may select the physical erasing unit 410(1) from the spare area 504, issue a programming command to write the random data RD4 into a zeroth physical programming unit of the physical erasing unit 410(1), and associate the physical erasing unit 410(1) with the data area 502.

Figure 13:
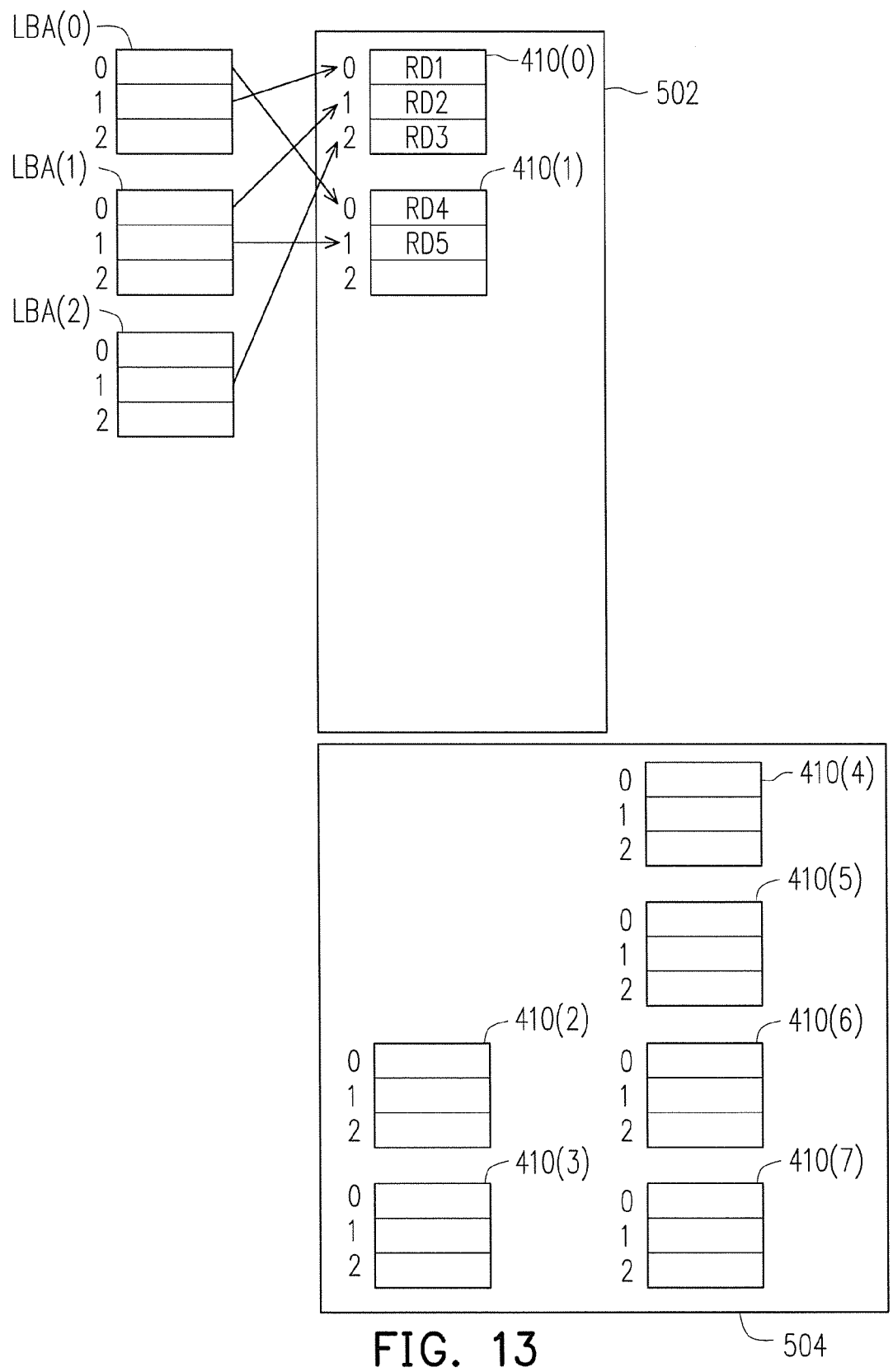

Referring to FIG. 13 as continue to FIG. 12, it is further assumed that random data RD5 is to be programmed and the random data RD5 belongs to a first logical page of the logical unit LBA(1), the memory control circuit unit 104 (or the memory management circuit 202) may issue a programming command to write the random data RD5 into a first physical programming unit of the physical erasing unit 410(1).

Figure 14:
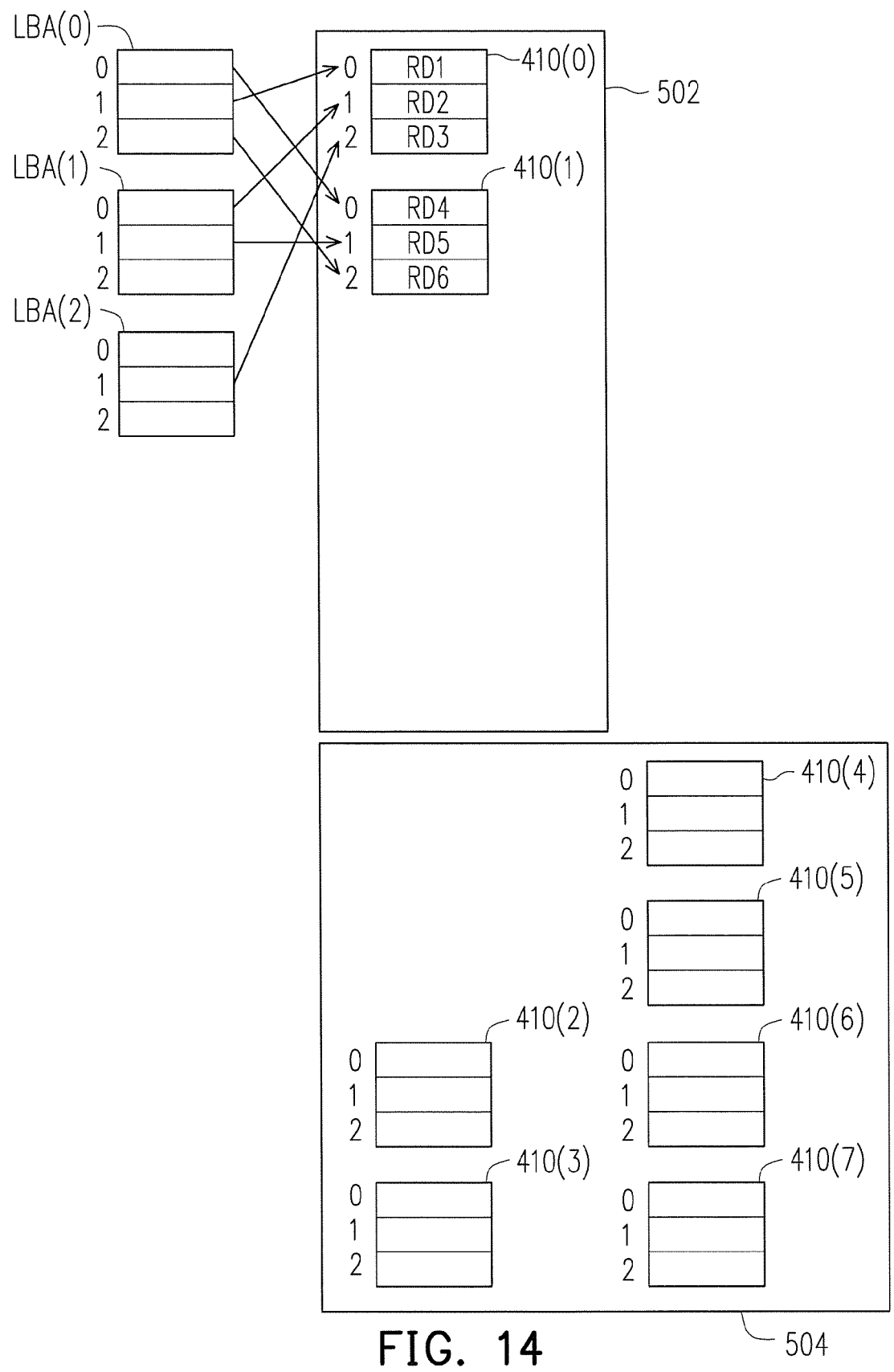

Referring to FIG. 14 as continue to FIG. 13, it is further assumed that random data RD6 is to be programmed and the random data RD6 belongs to a second logical page of the logical unit LBA(0), the memory control circuit unit 104 (or the memory management circuit 202) may issue a programming command to write the random data RD6 into a second physical programming unit of the physical erasing unit 410(1).

Figure 15:
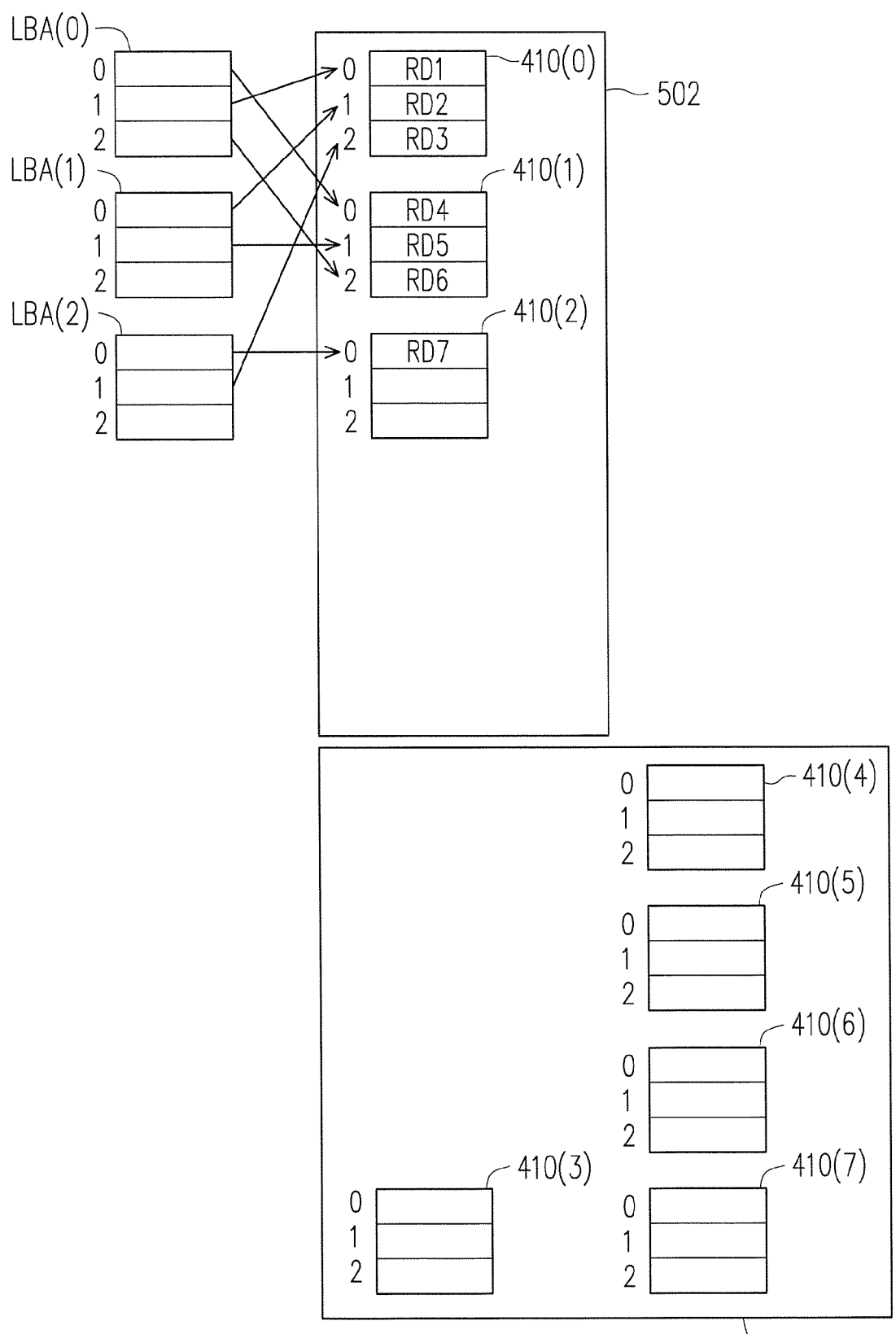

Referring to FIG. 15 as continue to FIG. 14, it is further assumed that random data RD7 is to be programmed and the random data RD7 belongs to a zeroth logical page of the logical unit LBA(2), but the physical erasing unit 410(1) is run out of storage spaces at the time. Therefore, the memory control circuit unit 104 (or the memory management circuit 202) may select the physical erasing unit 410(2) from the spare area 504, issue a programming command to write the random data RD7 into a zeroth physical programming unit of the physical erasing unit 410(2), and associate the physical erasing unit 410(2) with the data area 502.

Figure 16:
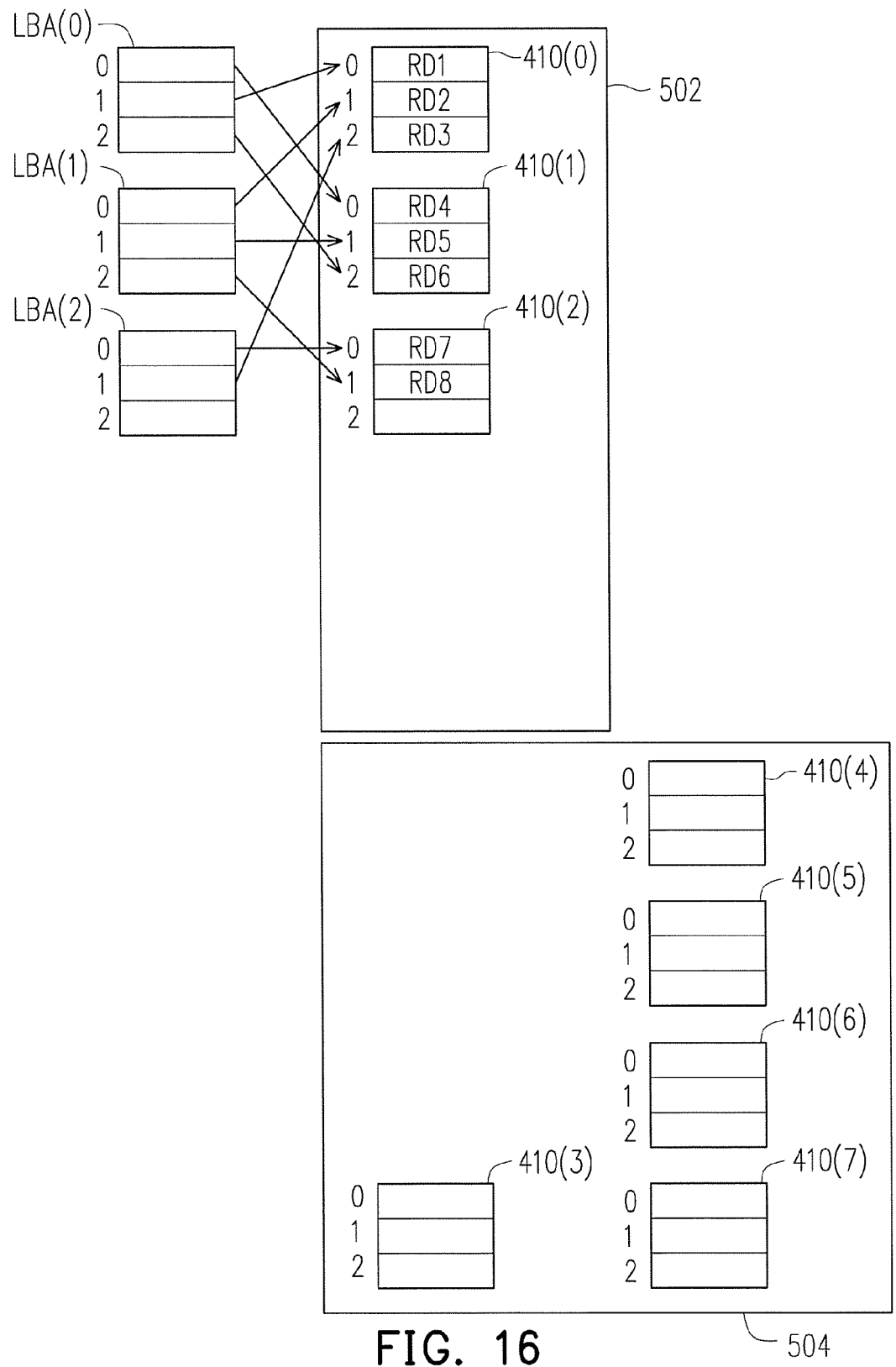

Referring to FIG. 16 as continue to FIG. 15, it is further assumed that random data RD8 is to be programmed and the random data RD8 belongs to a second logical page of the logical unit LBA(1), the memory control circuit unit 104 (or the memory management circuit 202) may issue a programming command to write the random data RD8 into a first physical programming unit of the physical erasing unit 410(2).

Figure 17:
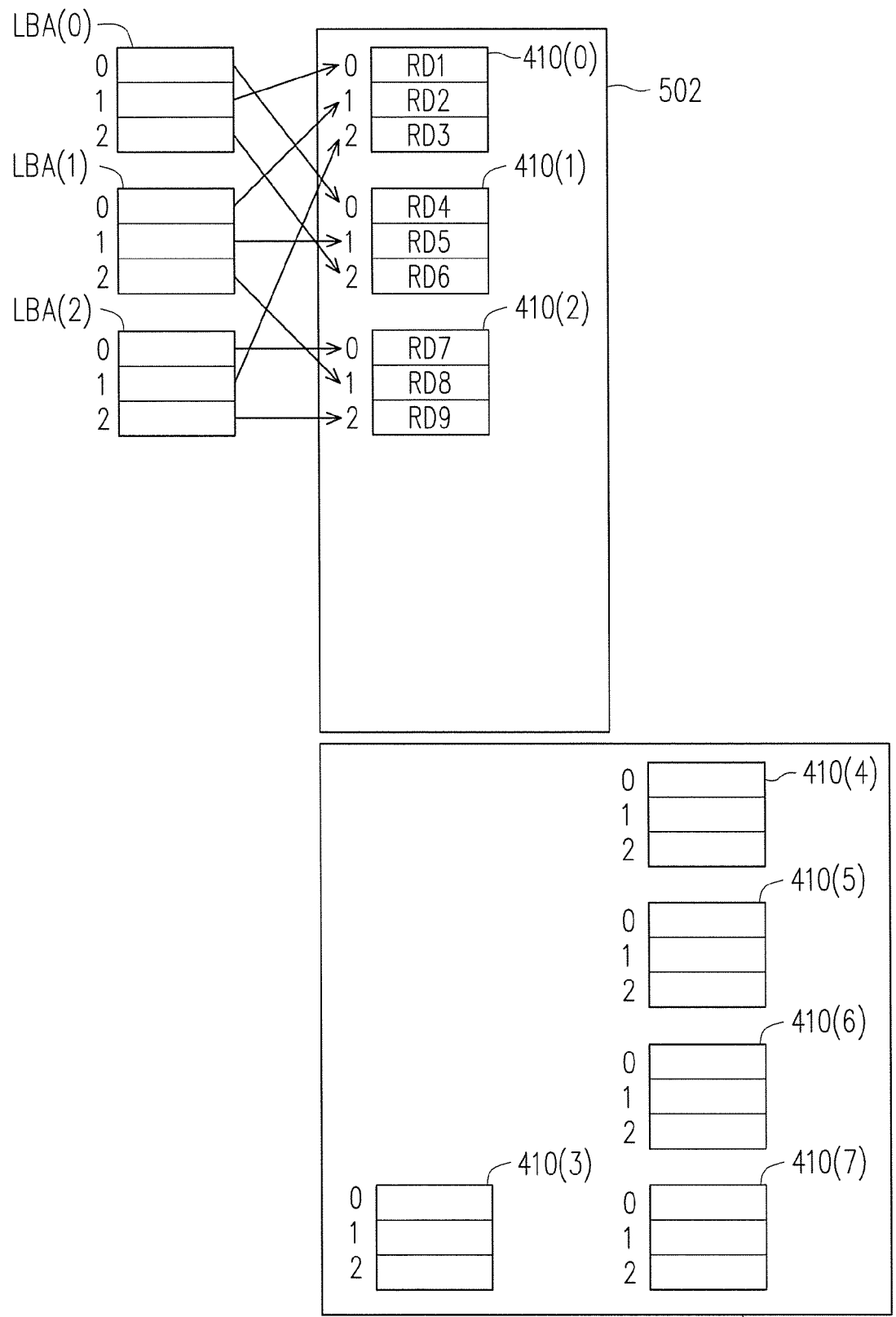

Referring to FIG. 17 as continue to FIG. 16, it is further assumed that random data RD9 is to be programmed and the random data RD9 belongs to a second logical page of the logical unit LBA(2), the memory control circuit unit 104 (or the memory management circuit 202) may issue a programming command to write the random data RD9 into a second physical programming unit of the physical erasing unit 410(2).

Figure 18:
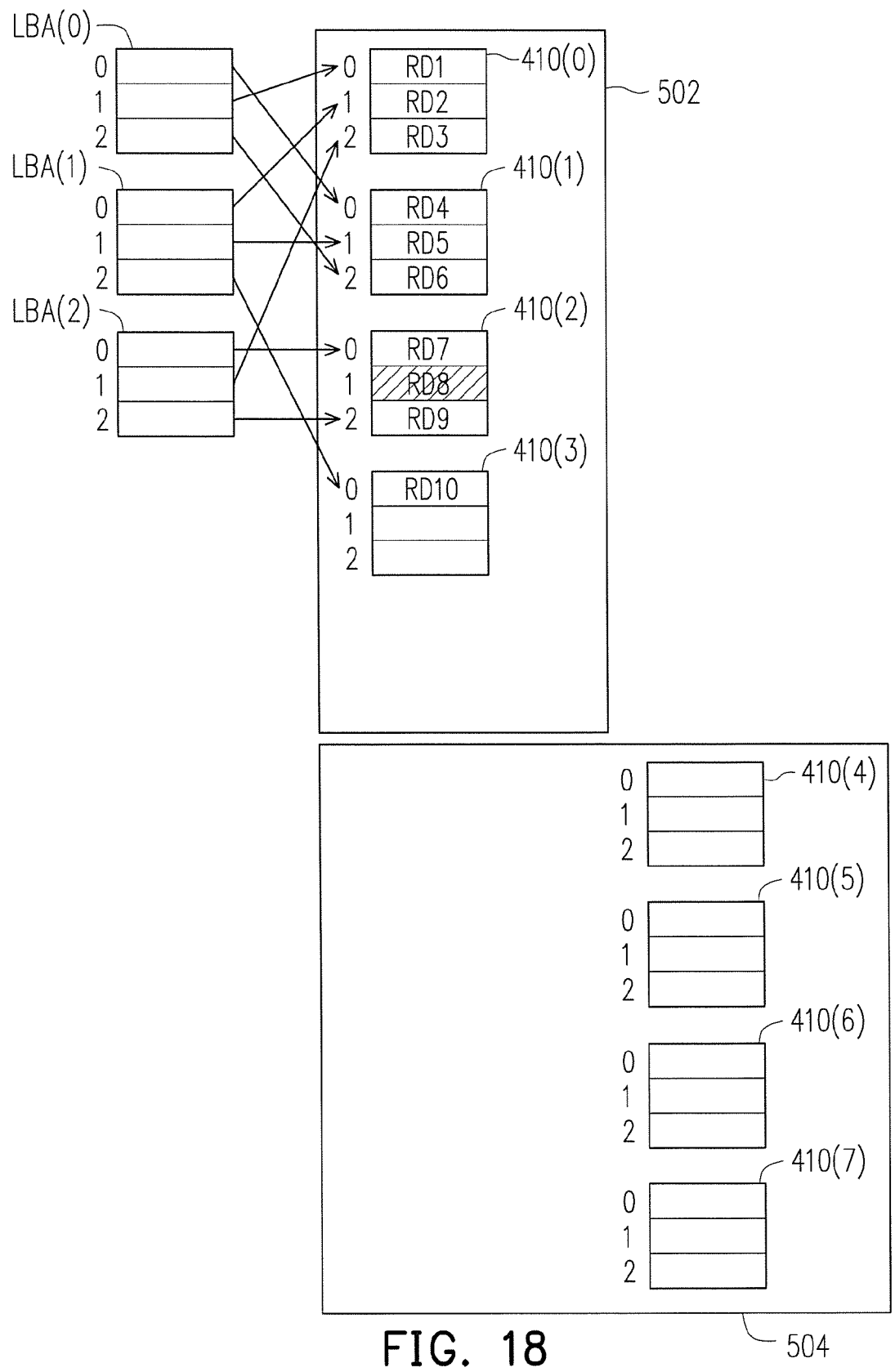

Referring to FIG. 18 as continue to FIG. 17, it is further assumed that random data RD10 is to be programmed and the random data RD10 belongs to a second logical page of the logical unit LBA(1), but the physical erasing unit 410(2) is run out of storage spaces at the time. Therefore, the memory control circuit unit 104 (or the memory management circuit 202) may select the physical erasing unit 410(3) from the spare area 504, issue a programming command to write the random data RD10 into a zeroth physical programming unit of the physical erasing unit 410(3), and relate the physical erasing unit 410(3) to the data area 502. Therein, the first physical programming unit of the physical erasing unit 410 (2) is marked as invalid (as shown by a dash line).

Figure 19:
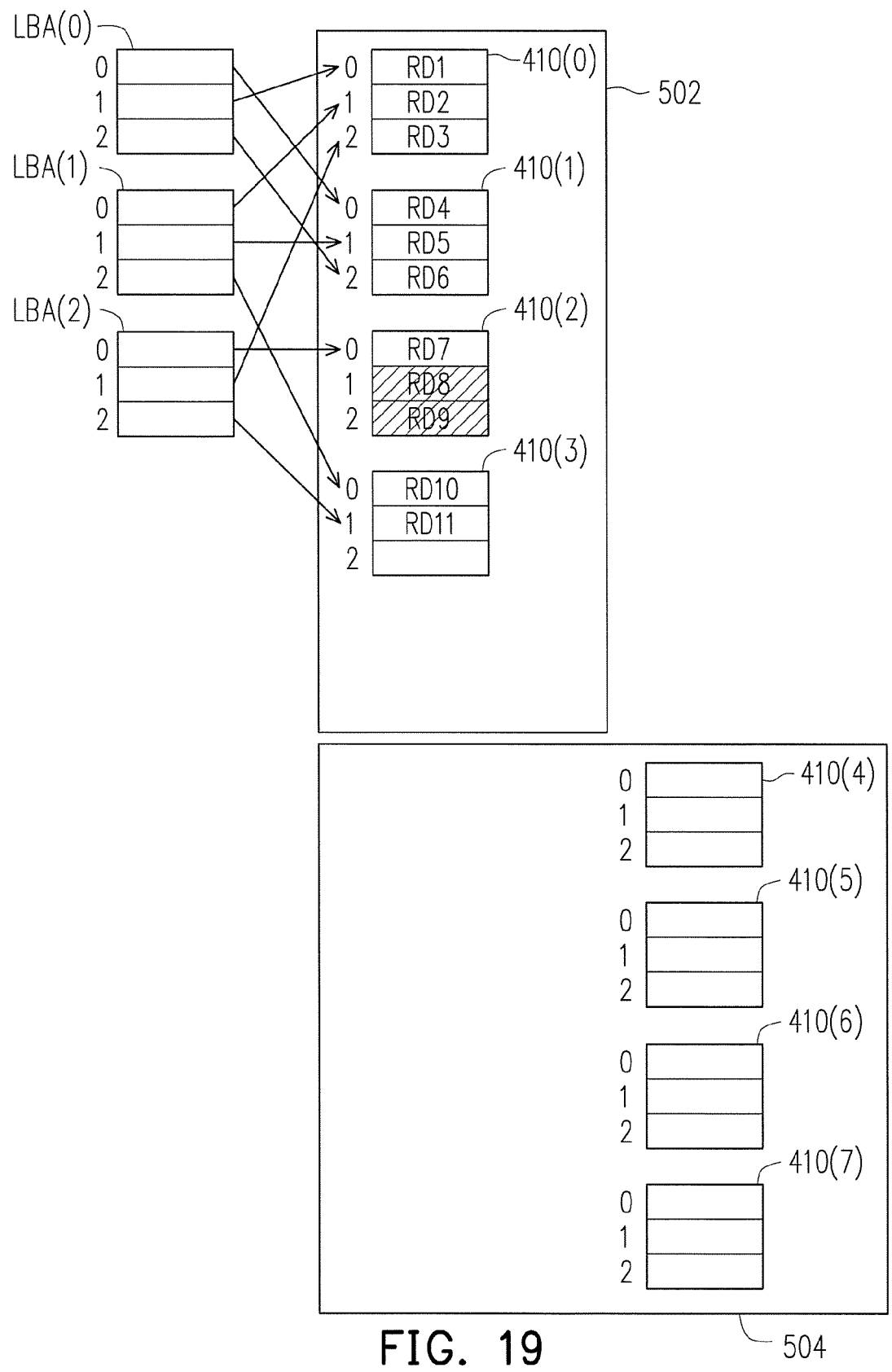

Referring to FIG. 19 as continue to FIG. 18, it is further assumed that random data RD11 is to be programmed and the random data RD11 belongs to a second logical page of the logical unit LBA(2), the memory control circuit unit 104 (or the memory management circuit 202) may issue a programming command to write the random data RD11 into a first physical programming unit of the physical erasing unit 410 (3). Therein, the second physical programming unit of the physical erasing unit 410(2) is marked as invalid (as shown by a dash line).

Figure 20:
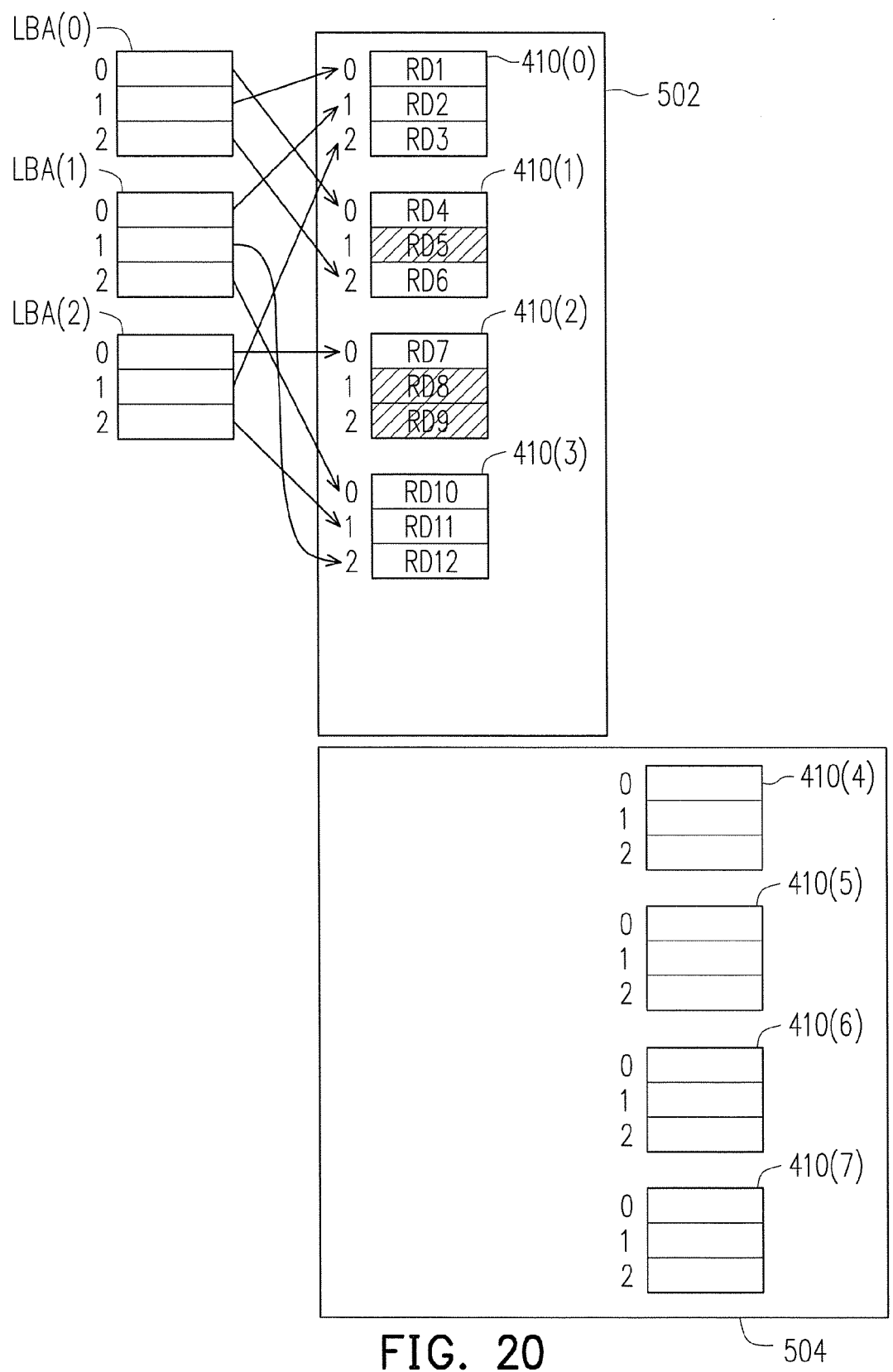

Referring to FIG. 20 as continue to FIG. 19, it is further assumed that random data RD12 is to be programmed and the random data RD12 belongs to a first logical page of the logical unit LBA(1), the memory control circuit unit 104 (or the memory management circuit 202) may issue a programming command to write the random data RD12 into a second physical programming unit of the physical erasing unit 410 (3). Therein, the first physical programming unit of the physical erasing unit 410(1) is marked as invalid (as shown by a dash line).

Accordingly, regardless whether the host system 1000 intends to store the data into the logical pages of which logical unit, the memory control circuit unit 104 (or the memory management circuit 202) may sequentially write the data to be stored by the host system 1000 into the current physical erasing unit used. In particular, if the number of the physical erasing units of the spare area 504 is not greater than the garbage collection threshold value, the memory control circuit unit 104 (or the memory management circuit 202) may execute the data merging procedure while executing the write command, so as to prevent the physical erasing units of the spare area from being used up.

Figure 21:
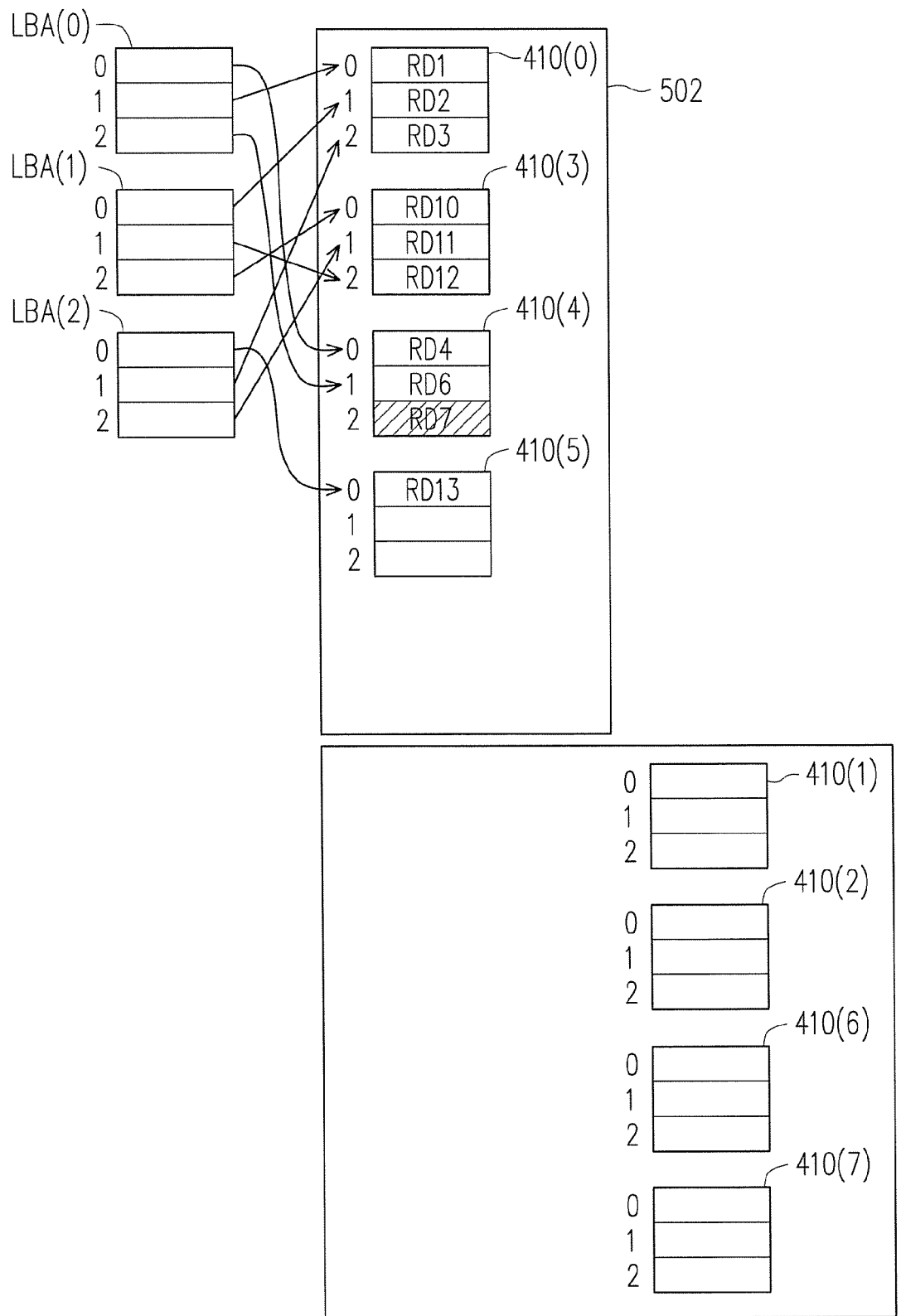
FIG. 21 illustrates a simplified example of executing a valid data merging procedure for completing subsequent write command.

FIG. 21 illustrates a simplified example of executing a valid data merging procedure for completing subsequent write command.

Referring to FIG. 21 as continue to FIG. 20, it is further assumed that random data RD13 is to be programmed and the random data RD13 belongs to a zeroth logical page of the logical unit LBA(2), but the physical erasing unit 410(3) is run out of storage spaces at the time. Therefore, the memory control circuit unit 104 (or the memory management circuit 202) is required to select the empty physical erasing unit from the spare area 504. However, in this case, the number of the physical erasing units of the spare area 504 is not greater than the garbage collection threshold value. Therefore, the memory control circuit unit 104 (or the memory management circuit 202) is required to execute the data merging procedure first. For instance, the memory control circuit unit 104 (or the memory management circuit 202) selects the physical erasing unit 410(4) from the spare area 504; copies the valid data (i.e., the data RD4 and RD6) in the physical erasing unit 410(1) and the valid data (i.e., the data RD7) in the physical erasing unit 410(2) to the physical erasing unit 410(4); associates the physical erasing unit 410(4) with the data area 502; marks the zeroth and the second physical programming units of the physical erasing unit 410(1) and the zeroth physical programming unit of the physical erasing unit 410(2) as invalid; performs an erasing operation on the physical erasing units stored with the invalid data (i.e., the physical erasing unit 410(1) and the physical erasing unit 410(2)); and associates the erased physical erasing units back to the spare area 504.

At this time, the number of the physical erasing units of the spare area 504 is restored back to 5 (greater than the garbage collection threshold value). Accordingly, the memory control circuit unit 104 (or the memory management circuit 202) may select the physical erasing unit 410(5) from the spare area 504, issue a programming command to write the random data RD13 into a zeroth physical programming unit of the physical erasing unit 410(5), and associate the physical erasing unit 410(5) with the data area 502. Therein, the physical programming unit stored with the data RD7 (i.e., the second physical programming unit of the physical erasing unit 410(4)) may be marked as invalid.

Figure 22:
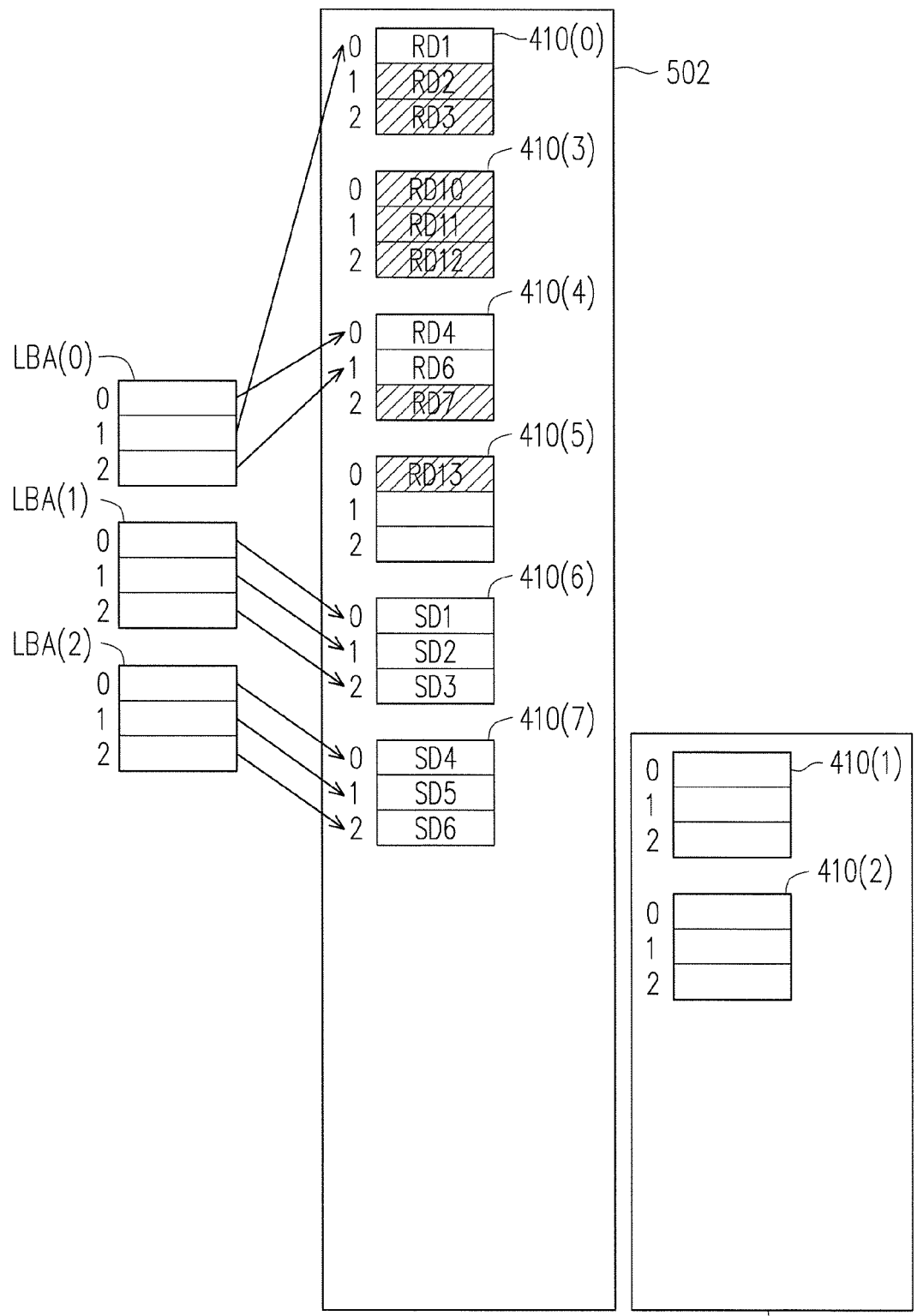
FIGS. 22 to 23 are schematic diagrams illustrating a sequential data written by using a sequential writing mechanism according to an exemplary embodiment of the present invention.
Figure 23:
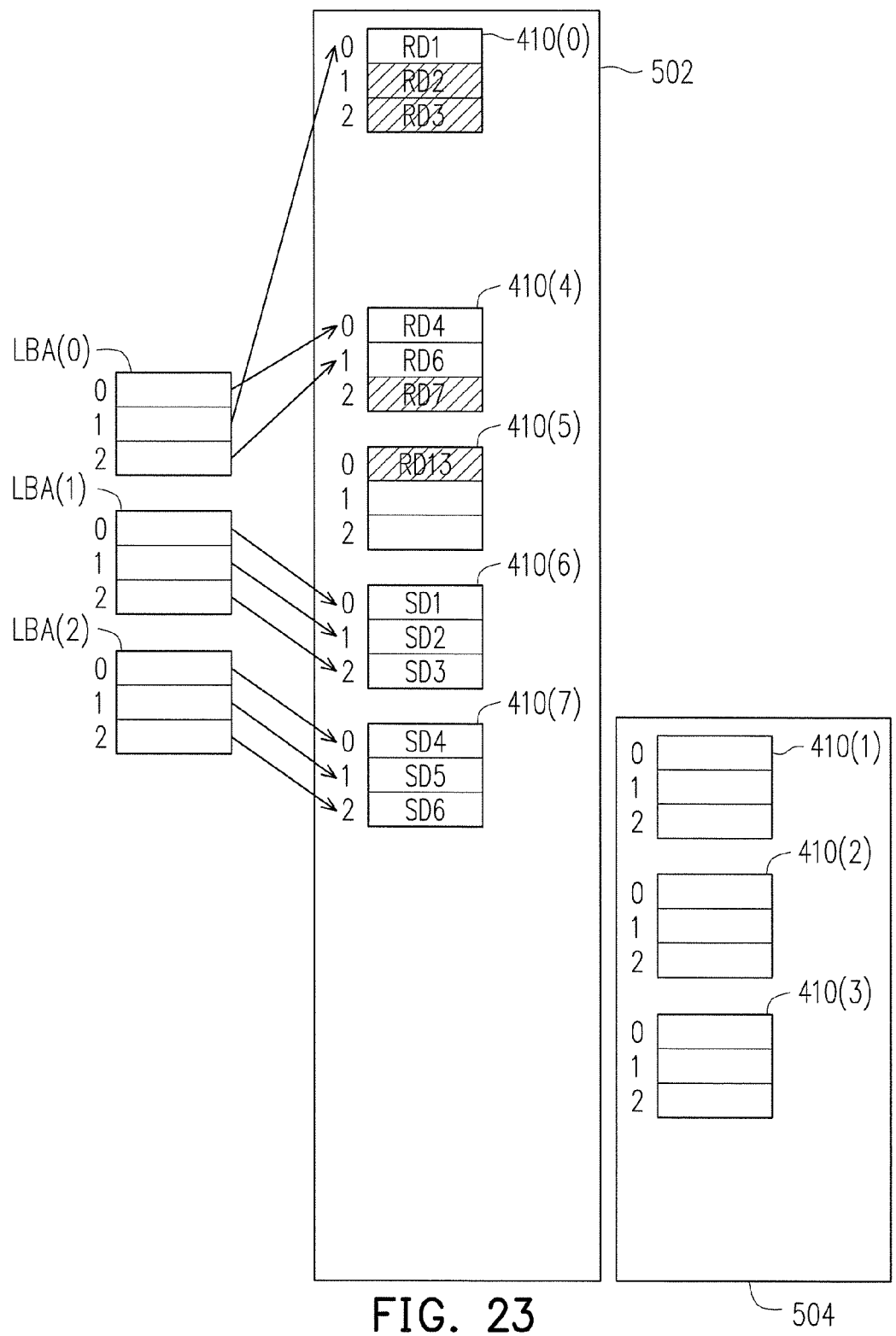

FIGS. 22 to 23 are schematic diagrams illustrating a sequential data written by using a sequential writing mechanism according to an exemplary embodiment of the present invention.

Referring to FIG. 22 as continue to FIG. 21, it is further assumed that sequential data SD1 to SD6 are to be programmed, and the sequential data SD1 to SD6 belong to zeroth to second logical pages of the logical unit LBA(1) and zeroth to second logical pages of the logical unit LBA(2). Since three of the physical erasing units are reserved in the spare area 504 dedicating to write the sequential data, the memory control circuit unit 104 (or the memory management circuit 202) may select the empty physical erasing units (i.e., the physical erasing units 410(6) and 410(7)) from the spare area 504, issue a programming command to write the sequential data SD1 to SD6 into the physical erasing units 410(6) and 410(7), and associate the physical erasing units 410(6) and 410(7) with the data area 502. In addition, the memory control circuit unit 104 (or the memory management circuit 202) may mark first and second physical programming units of the physical erasing unit 410(0), zeroth to second physical programming units of the physical erasing unit 410(3), and the zeroth physical programming unit of the physical erasing unit 410(5) as invalid.

Referring to FIG. 23, since the physical erasing unit 410(3) is only stored with the invalid data, the memory control circuit unit 104 (or the memory management circuit 202) may perform the erasing operation on the physical erasing unit 410(3) and associate the physical erasing unit 410(3) back to the spare area. Further, since the physical erasing unit dedicating to write the sequential data is already used, the memory control circuit unit 104 (or the memory management circuit 202) may adjust the garbage collection threshold value accordingly. More specifically, the memory control circuit unit 104 (or the memory management circuit 202) may subtract the number of the physical erasing units selected from the spare area 504 for executing the write command to write the sequential data from the current garbage collection threshold value, and determine whether a value obtained by subtracting the number of the physical erasing units selected from the spare area 504 for executing the write command to write the sequential data from the current garbage collection threshold value is not greater than the minimum threshold value. If the value obtained by subtracting the number of the physical erasing units selected from the spare area 504 for executing the write command to write the sequential data from the current garbage collection threshold value is not less than the minimum threshold value, the memory control circuit unit 104 (or the memory management circuit 202) may use the value obtained by subtracting the number of the physical erasing units selected from the spare area 504 for executing the write command to write the sequential data from the current garbage collection threshold value as a new garbage collection threshold value. If the value obtained by subtracting the number of the physical erasing units selected from the spare area 504 for executing the write command to write the sequential data from the current garbage collection threshold value is less than the minimum threshold value, the memory control circuit unit 104 (or the memory management circuit 202) may use the minimum threshold value as the new garbage collection threshold value. In the example of FIG. 22 and FIG. 23, the new garbage collection threshold value is set to 2.

In the example of FIG. 22 and FIG. 23, although the host system 1000 instructs to write a great amount of the sequential data at once, a time for executing the write command may be effectively reduced since the memory control circuit unit 104 (or the memory management circuit 202) does not need to make room for executing the data merging procedure.

FIGS. 24 to 27 are schematic diagrams illustrating random data written by using a random writing mechanism according to another exemplary embodiment of the invention.

Figure 24:
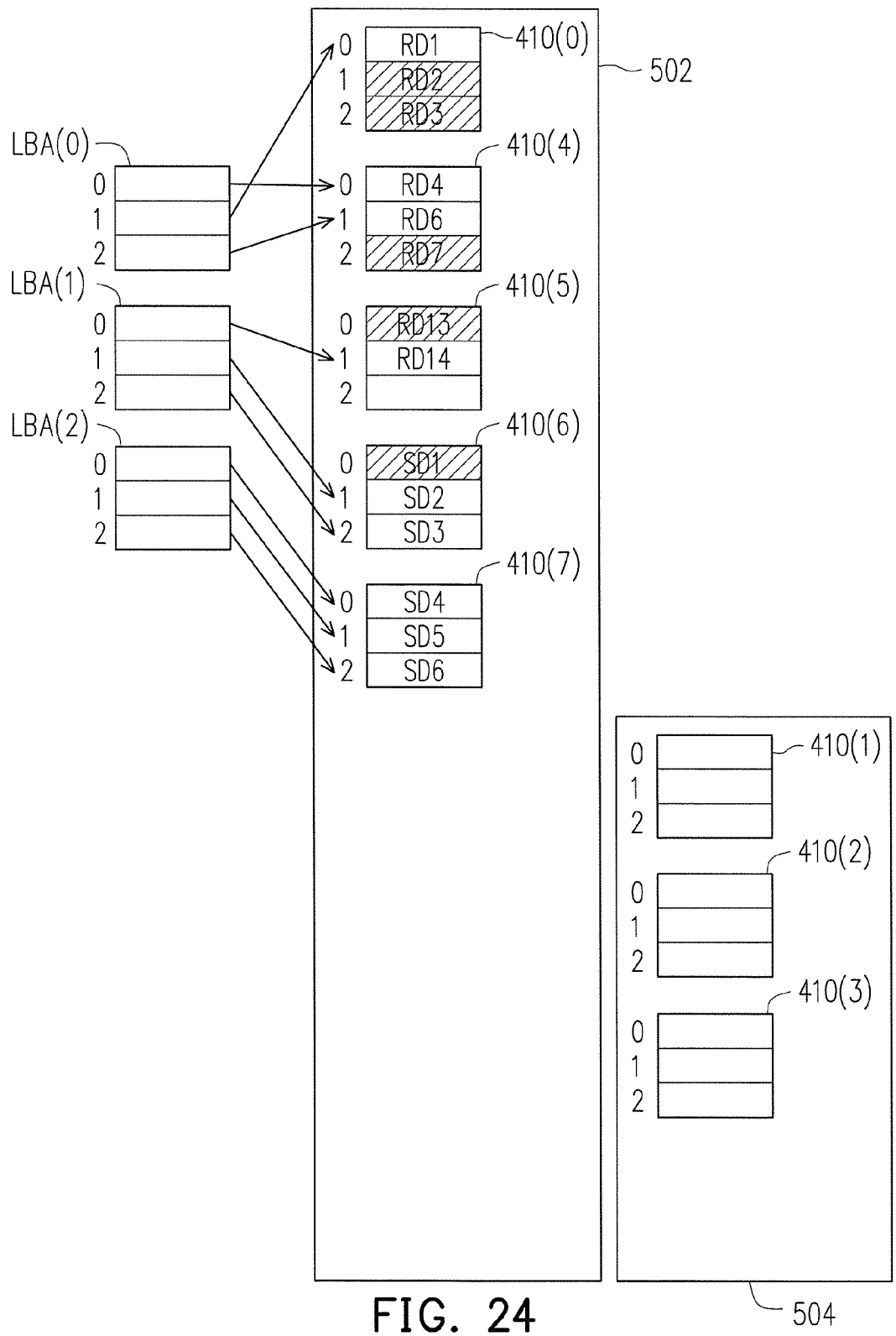
FIGS. 24 to 27 are schematic diagrams illustrating random data written by using a random writing mechanism according to another exemplary embodiment of the present invention.

Referring to FIG. 24 as continue to FIG. 23, it is further assumed that random data RD14 is to be programmed and the random data RD14 belongs to a zeroth logical page of the logical unit LBA(1), the memory control circuit unit 104 (or the memory management circuit 202) may issue a programming command to write the random data RD14 into a first physical programming unit of the physical erasing unit 410 (5). Therein, a zeroth physical programming unit of the physical erasing unit 410(6) originally mapped to the zeroth logical page of the logical unit LBA(1) may be marked as invalid.

Figure 25:
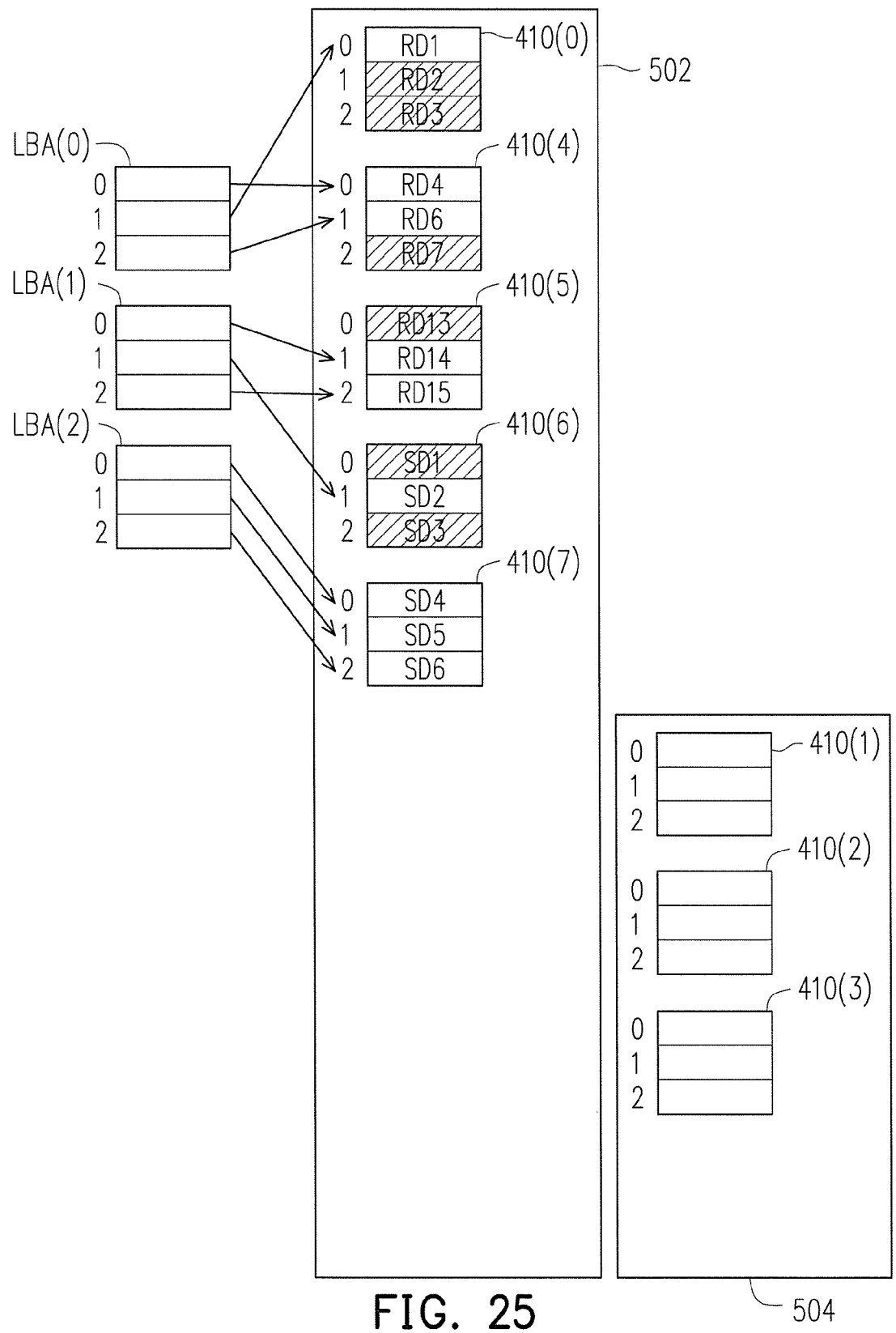

Referring to FIG. 25 as continue to FIG. 24, it is further assumed that random data RD15 is to be programmed and the random data RD15 belongs to a second logical page of the logical unit LBA(1), the memory control circuit unit 104 (or the memory management circuit 202) may issue a programming command to write the random data RD15 into a second physical programming unit of the physical erasing unit 410(5). Therein, a second physical programming unit of the physical erasing unit 410(6) originally mapped to the second logical page of the logical unit LBA(1) may be marked as invalid.

Figure 26:
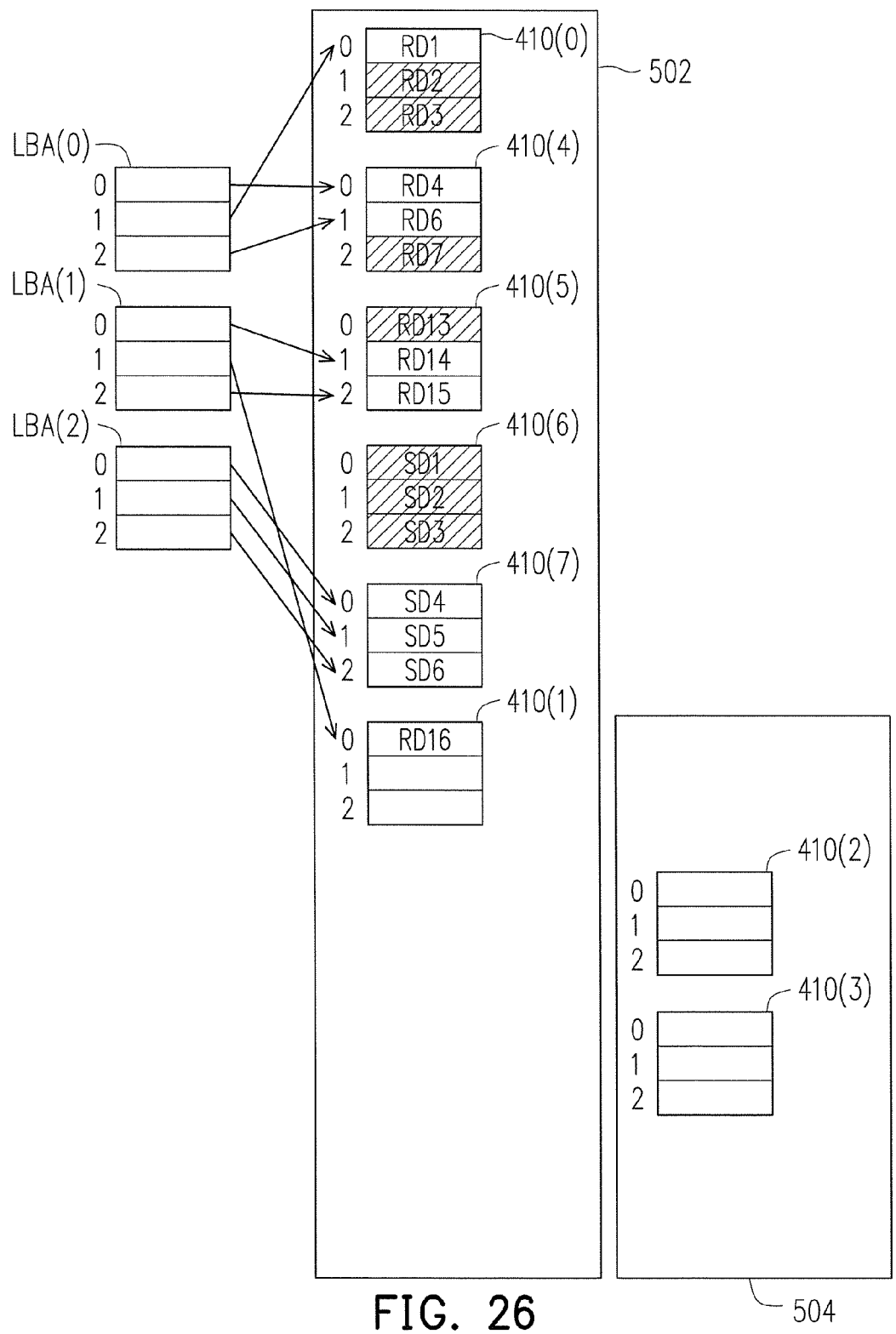

Referring to FIG. 26 as continue to FIG. 25, it is further assumed that random data RD16 is to be programmed and the random data RD16 belongs to a first logical page of the logical unit LBA(1), but the physical erasing unit 410(5) is run out of storage spaces at the time and the number of the physical erasing units of the spare area 504 is greater than the garbage collection threshold value. Therefore, the memory control circuit unit 104 (or the memory management circuit 202) may directly select the physical erasing unit 410(1) from the spare area 504, and write the random data RD16 into the zeroth physical programming unit of the physical erasing unit 410(1) without executing the data merging procedure. In the present example, the physical erasing unit 410(1) may be associated with the data area 502 again.

Figure 27:
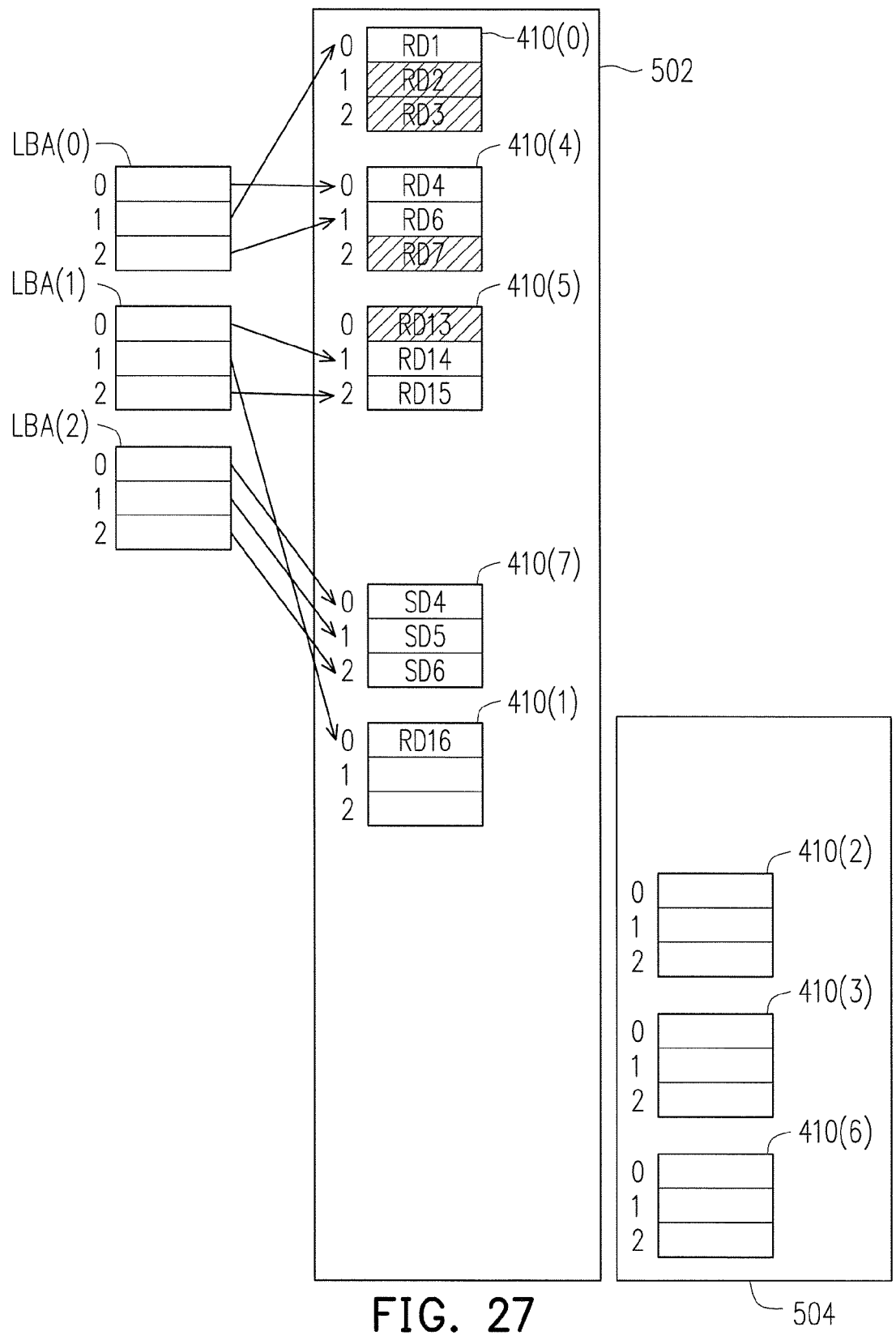

Since the physical erasing unit 410(6) is only stored with the invalid data, the memory control circuit unit 104 (or the memory management circuit 202) may perform the erasing operation on the physical erasing unit 410(6) and associate the physical erasing unit 410(6) with the spare area (see FIG. 27). In particular, since the physical erasing unit 410(6) is previously selected to write the sequential data, the memory control circuit unit 104 (or the memory management circuit 202) may add the current garbage collection threshold value by one to be the new garbage collection threshold value (i.e., 3).

In view of the example depicted in FIG. 8 to FIG. 27, it can be known that, the memory control circuit unit 104 (or the memory management circuit 202) according to the present exemplary embodiment may dynamically reserve a predetermined number of physical erasing units in the rewritable non-volatile memory module 106 dedicating to write the sequential data by adjusting the garbage collection threshold value, such that the memory storage apparatus 100 with the page-based management may effectively increase a writing speed for the sequential data.

Figure 28:
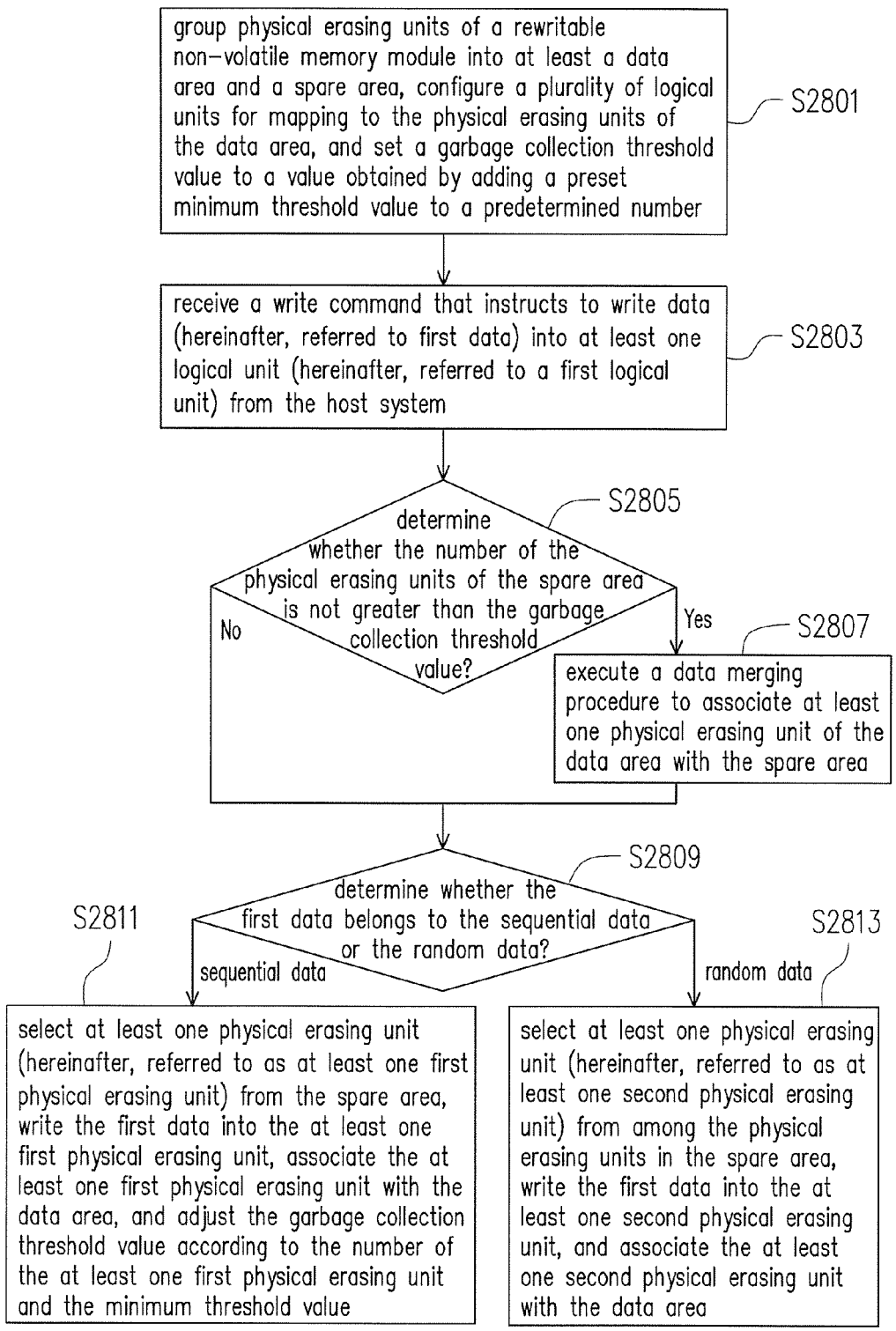
FIG. 28 is a flowchart of a data writing method according to an exemplary embodiment of the present invention.

FIG. 28 is a flowchart of a data writing method according to an exemplary embodiment of the present invention.

Referring to FIG. 28, in steps S2801, the memory control circuit unit 104 (or the memory management circuit 202) may group physical erasing units of a rewritable non-volatile memory module 106 into at least a data area and a spare area, configure a plurality of logical units for mapping to the physical erasing units of the data area 502, and set a garbage collection threshold value to a value obtained by adding a preset minimum threshold value to a predetermined number. As described above, the minimum threshold value is the number of physical erasing units required for the data merging procedure, and the predetermined number is the number of the physical erasing units reserved dedicating to write the sequential data. Herein, the minimum threshold value and the predetermined number may be any number properly set based on user requirements.

In step S2803, the memory control circuit unit 104 (or the memory management circuit 202) receives a write command from the host system 1000, in which the write command indicates to write data (hereinafter, referred to first data) into at least one logical unit (hereinafter, referred to a first logical unit).

In step S2805, the memory control circuit unit 104 (or the memory management circuit 202) may determine whether the number of the physical erasing units of the spare area 504 is not greater than the garbage collection threshold value.

If the number of the physical erasing units of the spare area 504 is not greater than the garbage collection threshold value, in step S2807, the memory control circuit unit 104 (or the memory management circuit 202) executes a data merging procedure to associate at least one physical erasing unit of the data area 502 with the spare area 504. For instance, the memory control circuit unit 104 (or the memory management circuit 202) selects one physical erasing unit (hereinafter, referred to as a third physical erasing unit) from among the physical erasing units of the data area; if at least one valid data is existed in the third physical erasing unit, copies the at least one valid data from the third physical erasing unit to another physical erasing unit (hereinafter, referred to as a fourth physical erasing unit) in the data area 502; erases the third physical erasing unit; and associates the erased third physical erasing unit with the spare area 504. The method of the data merging procedure are described in detail as above with reference to drawings, thus it is omitted hereinafter.

Thereafter, in step S2809, the memory control circuit unit 104 (or the memory management circuit 202) determines whether the first data belongs to the sequential data or the random data.

If the first data is the sequential data, in step S2811, the memory control circuit unit 104 (or the memory management circuit 202) may select at least one physical erasing unit (hereinafter, referred to as at least one first physical erasing unit) from the spare area 504; write the first data into the at least one first physical erasing unit; relate the at least one first physical erasing unit to the data area 502; and adjust the garbage collection threshold value according to the number of the at least one first physical erasing unit and the minimum threshold value. Herein, when a value obtained by subtracting the number of the at least one physical erasing unit from the garbage collection threshold value before adjustment is greater than the minimum threshold value, the garbage collection threshold value after adjustment is set to the value obtained by subtracting the number of the at least one physical erasing unit from the garbage collection threshold value before adjustment; and when the value obtained by subtracting the number of the at least one physical erasing unit from the garbage collection threshold value before adjustment is not greater than the minimum threshold value, the garbage collection threshold value after adjustment is set to the minimum threshold value.

If the first data is the random data, in step S2813, the memory control circuit unit 104 (or the memory management circuit 202) may select at least one physical erasing unit (hereinafter, referred to as at least one second physical erasing unit) from among the physical erasing units in the spare area 504; write the first data into the at least one second physical erasing unit; and relate the at least one second physical erasing unit to the data area 502.

Based on above, the data writing method, the memory control circuit unit and the memory storage apparatus according to the embodiments of the invention are capable of effectively programming the random data with the random writing mechanism as well as effectively writing a great amount of sequential data. As a result, the time for executing the write command for the great amount of data may be reduced, and loss of the data may also be prevented.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method for a rewritable non-volatile memory module having a plurality of physical erasing units, and the data writing method comprising:
   grouping the physical erasing units into at least a data area and a spare area;
   configuring a plurality of logical units for mapping to the physical erasing units of the data area; and
   dynamically reserving a predetermined number of physical erasing units dedicating to write sequential data,
   wherein the step of dynamically reserving the predetermined number of physical erasing units dedicating to write the sequential data comprises:
      receiving a write command from a host system, wherein the write command instructs to write first data into at least one first logical unit among the logical units;
      selecting at least one first physical erasing unit from among the physical erasing units of the spare area, writing the first data into the at least one first physical erasing unit, associating the at least one first physical erasing unit with the data area,
      if a value obtained by subtracting a number of the at least one physical erasing unit from a garbage collection threshold value before adjustment is greater than a minimum threshold value, the garbage collection threshold value after adjustment is set to the value obtained by subtracting the number of the at least one physical erasing unit from the garbage collection threshold value before adjustment,
      if the value obtained by subtracting the number of the at least one physical erasing unit from the garbage collection threshold value before adjustment is not greater than the minimum threshold value, the garbage collection threshold value after adjustment is set the minimum threshold value.

2. The data writing method of claim 1, further comprising:
   if the first data is random data, selecting at least one second physical erasing unit from among the physical erasing units of the spare area, writing the first data into the at least one second physical erasing unit, and associating the at least one second physical erasing unit with the data area.

3. The data writing method of claim 2, wherein the step of dynamically reserving the predetermined number of physical erasing units dedicating to write the sequential data further comprises:
   determining whether the number of the physical erasing units of the spare area is not greater than the garbage collection threshold value; and
   if the number of the physical erasing units of the spare area is not greater than the garbage collection threshold value, executing a data merging procedure to associate at least one physical erasing unit of the data area with the spare area.

4. The data writing method of claim 3, wherein the step of executing the data merging procedure to associate the at least one physical erasing unit of the data area with the spare area comprises:
   selecting a third physical erasing unit form among the physical erasing units of the data area;
   if at least one valid data is existed in the third physical erasing unit, copying the at least one valid data from the third physical erasing unit to a fourth physical erasing unit in the data area; and
   erasing the third physical erasing unit, and associating the erased third physical erasing unit with the spare area.

5. The data writing method of claim 1, wherein a volume of the logical units is equal to a volume of the physical erasing units of the data area, and a volume of the predetermined number of physical erasing units is less than or equal to the volume of the logical units.

6. A memory control circuit unit, configured to control a rewritable non-volatile memory module, and the memory control circuit unit comprising:
   a host interface configured to couple to a host system;
   a memory interface, configured for coupling to the rewritable non-volatile memory module, wherein the rewritable non-volatile memory module has a plurality of physical erasing units; and
   a memory management circuit coupled to the host interface and the memory interface, and configured to group the physical erasing units into at least a data area and a spare area,
   wherein the memory management circuit is further configured to configure a plurality of logical units for mapping to the physical erasing units of the data area,
   wherein the memory management circuit is further configured to dynamically reserve a predetermined number of physical erasing units dedicating to write sequential data by adjusting a garbage collection threshold value,
   wherein the memory management circuit receives a write command from the host system to write the sequential data, wherein the write command indicates to write first data into at least one first logical unit among the logical units,
   wherein the memory management circuit selects at least one first physical erasing unit from among the physical erasing units of the spare area, writes the first data into the at least one first physical erasing unit, associates the at least one first physical erasing unit with the data area,
   wherein if a value obtained by subtracting a number of the at least one physical erasing unit from the garbage collection threshold value before adjustment is greater than a minimum threshold value, the memory management circuit adjusts the garbage collection threshold value to the value obtained by subtracting the number of the at least one physical erasing unit from the garbage collection threshold value before adjustment,
   wherein if the value obtained by subtracting the number of the at least one physical erasing unit from the garbage collection threshold value before adjustment is not greater than the minimum threshold value, the memory management circuit adjusts the garbage collection threshold value to the minimum threshold value.

7. The memory control circuit unit of claim 6, wherein if the first data is the random data, the memory management circuit selects at least one second physical erasing unit from among the physical erasing units of the spare area, writes the first data into the at least one second physical erasing unit, and associates the at least one second physical erasing unit with the data area.

8. The memory control circuit unit of claim 7, wherein the memory management circuit determines whether the number of the physical erasing units of the spare area is not greater than the garbage collection threshold value,
   if the number of the physical erasing units of the spare area is not greater than the garbage collection threshold value, the memory management circuit executes a data merging procedure to associate at least one physical erasing unit of the data area with the spare area.

9. The memory control circuit unit of claim 8, wherein in the operation of executing the data merging procedure to associate the at least one physical erasing unit of the data area with the spare area, the memory management circuit selects a third physical erasing unit form among the physical erasing units of the data area, erases the third physical erasing unit, and associates the erased third physical erasing unit with the spare area, wherein if at least one valid data is existed in the third physical erasing unit, the memory management circuit copies the at least one valid data from the third physical erasing unit to a fourth physical erasing unit in the data area before erasing the third physical erasing units.

10. The memory control circuit unit of claim 6, wherein a volume of the logical units is equal to a volume of the physical erasing units of the data area, and a volume of the predetermined number of physical erasing units is less than or equal to the volume of the logical units.

11. A memory storage apparatus, comprising:
a connection interface unit configured to couple to a host system;
a rewritable non-volatile memory module having a plurality of physical erasing units; and
a memory control circuit unit coupled to the connection interface unit and the rewritable non-volatile memory module, and configured to divide the physical erasing units into at least a data area and a spare area,
wherein the memory control circuit unit is further configured to configure a plurality of logical units for mapping to the physical erasing units of the data area,
wherein the memory control circuit unit is further configured to dynamically reserve a predetermined number of physical erasing units dedicating to write sequential data by adjusting a garbage collection threshold value,
wherein the memory control circuit unit receives a write command from the host system to write the sequential data, wherein the write command indicates to write first data into at least one first logical unit among the logical units,
wherein the memory control circuit unit selects at least one first physical erasing unit from among the physical erasing units of the spare area, writes the first data into the at least one first physical erasing unit, associates the at least one first physical erasing unit with the data area,
wherein if a value obtained by subtracting a number of the at least one physical erasing unit from the garbage collection threshold value before adjustment is greater than a minimum threshold value, the memory control circuit unit adjusts the garbage collection threshold value to the value obtained by subtracting the number of the at least one physical erasing unit from the garbage collection threshold value before adjustment,
wherein if the value obtained by subtracting the number of the at least one physical erasing unit from the garbage collection threshold value before adjustment is not greater than the minimum threshold value, the memory control circuit unit adjusts the garbage collection threshold value to the minimum threshold value.

12. The memory storage apparatus of claim 11, wherein if the first data is the random data, the memory control circuit unit selects at least one second physical erasing unit from among the physical erasing units of the spare area, writes the first data into the at least one second physical erasing unit, and associates the at least one second physical erasing unit with the data area.

13. The memory storage apparatus of claim 12, wherein the memory control circuit unit determines whether the number of the physical erasing units of the spare area is not greater than the garbage collection threshold value,
if the number of the physical erasing units of the spare area is not greater than the garbage collection threshold value, the memory control circuit unit executes a data merging procedure to associate at least one physical erasing unit of the data area with the spare area.

14. The memory storage apparatus of claim 13, wherein in the operation of executing the data merging procedure to relate the at least one physical erasing unit of the data area to the spare area, the memory control circuit unit selects a third physical erasing unit form among the physical erasing units of the data area, erases the third physical erasing unit, and associates the erased third physical erasing unit with the spare area,
wherein if at least one valid data is existed in the third physical erasing unit, the memory control circuit unit copies the at least one valid data from the third physical erasing unit to a fourth physical erasing unit in the data area before erasing the third physical erasing units.

15. The memory storage apparatus of claim 11, wherein a volume of the logical units is equal to a volume of the physical erasing units of the data area, and a volume of the predetermined number of physical erasing units is less than or equal to the volume of the logical units.

* * * * *